US011219837B2

(12) United States Patent
Rico et al.

(10) Patent No.: US 11,219,837 B2
(45) Date of Patent: Jan. 11, 2022

(54) ROBOT UTILITY AND INTERFACE DEVICE

(71) Applicant: Sony Interactive Entertainment Inc., Tokyo (JP)

(72) Inventors: Javier Fernandez Rico, Pacifica, CA (US); Erik Beran, Belmont, CA (US); Michael Taylor, San Mateo, CA (US); Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 190 days.

(21) Appl. No.: 15/721,673

(22) Filed: Sep. 29, 2017

(65) Prior Publication Data

US 2019/0099681 A1 Apr. 4, 2019

(51) Int. Cl.
*G06F 3/00* (2006.01)
*A63F 13/90* (2014.01)
(Continued)

(52) U.S. Cl.
CPC ............ *A63F 13/90* (2014.09); *A63F 13/213* (2014.09); *B25J 5/007* (2013.01); *B25J 9/046* (2013.01); *B25J 11/003* (2013.01); *B25J 11/0005* (2013.01); *B25J 11/008* (2013.01); *B25J 13/08* (2013.01); *B25J 15/04* (2013.01); *B25J 15/10* (2013.01); *G06F 3/017* (2013.01); *G06F 3/0425* (2013.01); *G06F 3/04817* (2013.01); *G06F 3/167* (2013.01); *H04N 9/3173* (2013.01); *H04N 9/3182* (2013.01); *H04N 9/3185* (2013.01); *H04N 9/3194* (2013.01)

(58) Field of Classification Search
CPC ..... A63F 13/90; A63F 13/213; H04N 9/3194; H04N 9/3182; H04N 9/3185; H04N 9/3173; G06F 3/017; G06F 3/0425; G06F 3/04817; G06F 3/167; B25J 5/007; B25J 9/046; B25J 11/0005; B25J 11/008; B25J 11/003; B25J 13/08; B25J 15/04; B25J 15/10
See application file for complete search history.

(56) References Cited

U.S. PATENT DOCUMENTS 8,887,043 B1 * 11/2014 Pollack ................. G06F 3/0304
345/108
10,155,166 B1 * 12/2018 Taylor ................... A63F 13/428
(Continued)

OTHER PUBLICATIONS

International Search Report PCT/US2018/053241, dated Dec. 19, 2018, 4 pages.
(Continued)

*Primary Examiner* — Kyle R Stork
(74) *Attorney, Agent, or Firm* — Penilla IP, APC

(57) ABSTRACT

Methods and systems are provided for providing real world assistance by a robot utility and interface device (RUID) are provided. A method provides for identifying a position of a user in a physical environment and a surface within the physical environment for projecting an interactive interface. The method also provides for moving to a location within the physical environment based on the position of the user and the surface for projecting the interactive interface. Moreover, the method provides for capturing a plurality of images of the interactive interface while the interactive interface is being interacted with by the use and for determining a selection of an input option made by the user.

17 Claims, 16 Drawing Sheets

(51) Int. Cl.

| | |
|---|---|
| *B25J 5/00* | (2006.01) |
| *H04N 9/31* | (2006.01) |
| *B25J 11/00* | (2006.01) |
| *B25J 15/10* | (2006.01) |
| *B25J 9/04* | (2006.01) |
| *B25J 15/04* | (2006.01) |
| *A63F 13/213* | (2014.01) |
| *B25J 13/08* | (2006.01) |
| *G06F 3/01* | (2006.01) |
| *G06F 3/042* | (2006.01) |
| *G06F 3/0481* | (2013.01) |
| *G06F 3/16* | (2006.01) |

(56) References Cited

U.S. PATENT DOCUMENTS

| | | | |
|---|---|---|---|
| 2012/0327315 A1* | 12/2012 | Larsen | H04N 5/66 |
| | | | 348/745 |
| 2013/0253703 A1 | 9/2013 | Smith | |
| 2015/0089453 A1 | 3/2015 | Dal Mutto et al. | |
| 2016/0041628 A1 | 2/2016 | Verma | |
| 2017/0187106 A1* | 6/2017 | Hashimoto | H01Q 3/06 |
| 2018/0007328 A1* | 1/2018 | Kursula | H04N 9/3194 |
| 2018/0007341 A1* | 1/2018 | Okuley | G06K 9/00201 |

OTHER PUBLICATIONS

Stricker et al., "R2D2 reloaded: Dynamic video projection on a mobile service robot", 2015 European Conference on Mobile Robots (ECMR), IEEE, Sep. 2, 2015, pp. 1-6.

* cited by examiner

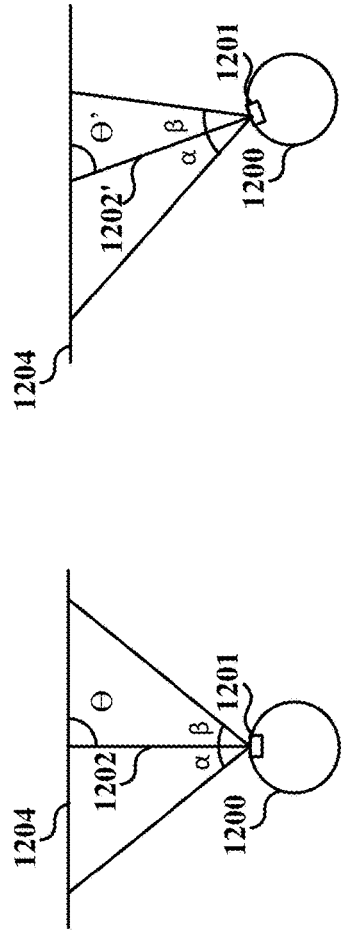
Figure 12A
Figure 12B
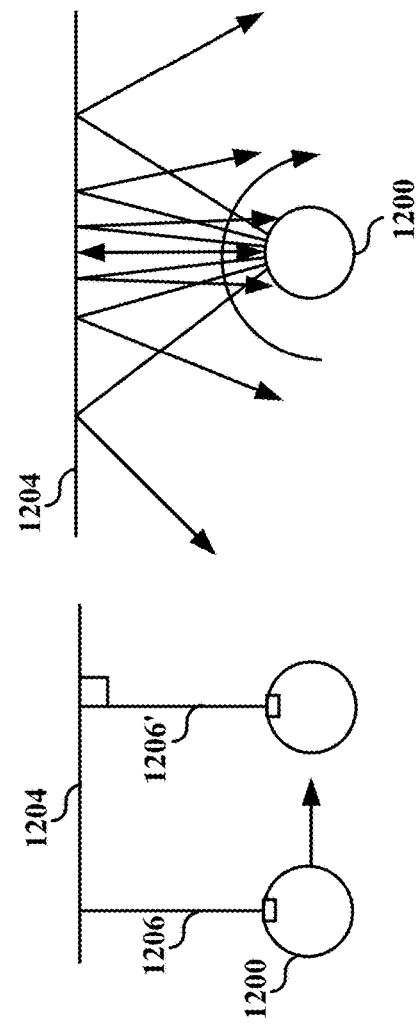
Figure 12C
Figure 12D
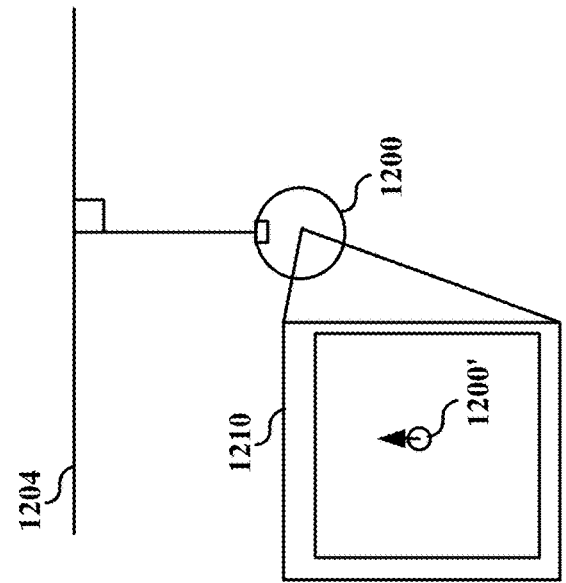
Figure 12E

ROBOT UTILITY AND INTERFACE DEVICE

FIELD OF THE DISCLOSURE

The present disclosure relates generally to personal robot utility and interface devices (RUIDs) and more particularly to methods and systems for enabling a robot to provide interactive interfaces to users and to provide accessory devices for interacting with the provided interactive interfaces.

BACKGROUND

Virtual assistants such as Apple's Ski, Amazon's Alexa, and Microsoft's Cortana are becoming increasingly popular platforms for users to access information and certain types of content. Virtual assistants allow users to obtain answers to questions, play audio content, and even purchase consumer goods. The ability of current virtual assistants is limited, however, in the type of assistance that may be provided. For example, virtual assistants are generally only able to provide virtual (e.g., making an electronic purchase) or digital assistance that is communicable by audio. As a result, virtual assistants are lacking in their ability to deliver assistance in the "real world" because they are not able to perform tasks involving real world objects. Moreover, current virtual assistants are lacking in their ability to interact with users, typically being responsive to voice commands but limited in other input and output modalities.

It is in this context that embodiments arise.

SUMMARY

Embodiments of the present disclosure relate to methods and systems for providing users with "real world" assistance by a robot utility and interface device (RUID) and with interactive interfaces for communicating with the RUID. In one embodiment, a method is disclosed for providing an interactive interface by a robot that includes an operation for identifying a position of a user within a physical environment. The method also identifies a surface within the physical environment for projecting the interactive interface for the user to view. Further, the method provides and operation for moving to a location within the physical environment based on the position of the user and the surface for projecting the interactive interface. Moreover, according this embodiment, the method provides operations for capturing a plurality of images of the interactive interface while the interactive interface is being interacted with by the user, and for determining, from the plurality of images, a selection of an input option made by the user. In certain embodiments, the selection of the input option is communicated to a server for processing the selection.

In another embodiment, a robot for providing an interactive interface is described. The robot includes a plurality of sensors for obtaining data associated with a physical environment. The plurality of sensors includes one or more cameras, and the data associated with the physical environment is usable for constructing a map of the physical environment, as well as for identifying a position of a user within the physical environment and a surface for projecting the interactive interface. The robot additionally includes a processor configured for processing the data associated with the physical environment for determining a location within the physical environment where the robot is to move for said projecting the interactive interface based on the map of the physical environment, the position of the user, and a location of the surface. According the present embodiment, the robot also includes a locomotion unit for moving the robot to the location within the physical environment, a graphics unit for rendering the interactive interface, and a projector system configured for projecting the interactive interface onto the surface. Moreover, the one or more cameras are configured to capture a plurality of images of the interactive interface while the interactive interface is being interacted with by the user, and the processor is further configured to process the plurality of images for determining a selection by the user of an input option.

In another embodiment, a method for providing a gaming session by a robot is described. The method includes operations for receiving an instruction from a user to execute a video game and for identifying a position of a user within a physical environment. The method also includes operations for identifying attributes of a surface within the physical environment for projecting the video game. According to the present embodiment, the method provides operations for determining a game controller from a plurality of game controllers to be used by the user for interacting with the video game and for establishing a wireless connection with the game controller. Further operations have the robot moving to a first location proximal to the user for delivering the game controller to the user and then to second location for projecting a graphical output of the video game based on the position of the user and the attributes of the surface. Moreover, the method has an operation for executing the video game and projecting the graphical output of the video game onto the surface, wherein the game controller enables the user to interact with the video game.

In some embodiments, determining the game controller from the plurality of game controllers is based on a request made by the user, a preference setting of the user, a prediction, a degree of randomness, or a specification provided by the video game.

In further embodiments, the game controller may be a detachable part that is mounted to the robot. For example, the game controller may be a robotic arm of the robot that is configured to allow the user to interact with the video game by detaching the robotic arm or portions thereof.

In various embodiments, the robot is configured to be ridden by an HMD user interacting with a virtual reality scene. In these embodiments, the robot cooperates with the HMD to provide movements in the real world space synchronous to movements in the virtual space of the VR scene.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 12A-12E illustrate conceptual models for orienting a video projector of a robot to have a projection axis that is perpendicular to a surface for projection.

DETAILED DESCRIPTION

Figure 1A:
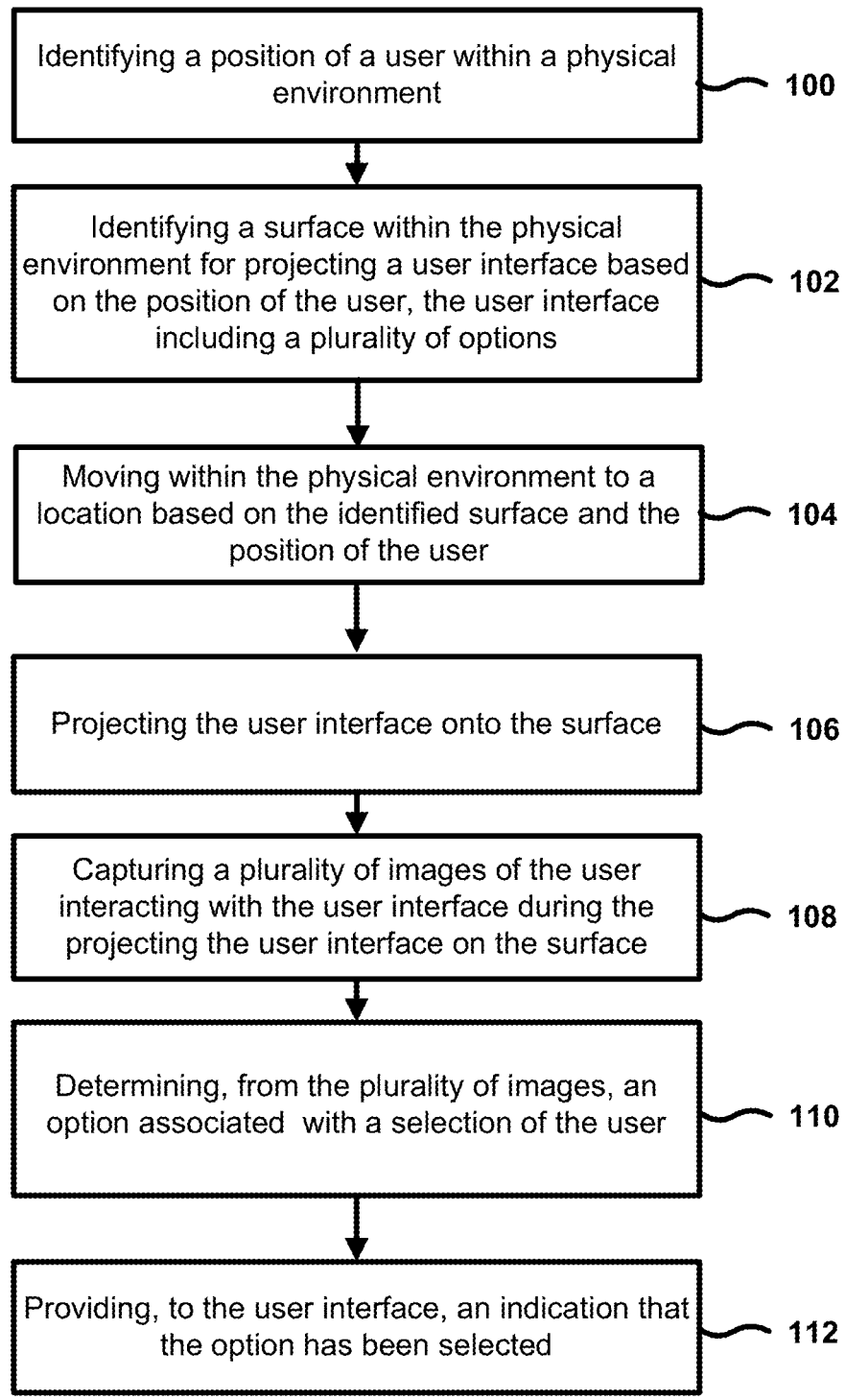
FIGS. 1A and 1B show overall flows of methods for providing interactive interfaces projected onto surfaces, according to certain embodiments.

The following embodiments describe methods, computer programs, and apparatuses for enabling a robot to provide interactive interfaces for presentation of content and to supply interaction devices to for interacting with the content. It will be obvious, however, to one skilled in the art, that the present disclosure may be practiced without some or all of these specific details. In other instances, well known process operations have not been described in detail in order to not unnecessarily obscure the present disclosure.

Virtual assistants such as Apple's Ski, Amazon's Alexa, and Microsoft's Cortana are becoming increasingly popular platforms for users to access information and certain types of content. Virtual assistants allow users to obtain answers to questions, play audio content, and even purchase consumer goods.

The ability of current virtual assistants is limited, however, in the type of assistance that may be provided. For example, virtual assistants generally only excel at providing informational, digital, and electronic assistance, but fall short in other types of assistance that a user may need. For example, current virtual assistants are not able to retrieve a physical good to a user, modify the physical good for the user, or relocate itself according to a location of the user. That is, current virtual assistants are limited in their ability to perform "real world" tasks such as those involving spatial navigation and physical manipulation. As a result, virtual assistants are lacking in their ability to deliver assistance in the "real world" because they are not able to perform tasks involving real world objects.

Virtual assistants are further lacking in their ability to provide user interfaces for users to interact with, typically allowing only voice input and output. There are various types of information and content that are less effectively transmitted by a virtual assistant's voice. Other types of content simply cannot be transmitted via voice.

Moreover, the functionality of virtual assistants is limited in the context of media presentation environments such as for playing a video game. For example, virtual assistants are generally not able to assist a player in setting up a video game session or assist a player during interaction with the video game. Often, limitations to virtual assistants in the abovementioned contexts stem from a lack of a real world presence, a lack of an awareness of real world contents, a lack of mobility, a lack of an ability to manipulate physical objects, a lack of connectivity to a media player or gaming device, and a lack of a real world interface.

Systems, methods, and apparatuses described here enable real world assistance to users by completing real world tasks and by providing real world user interfaces for users to interact with. According to one embodiment, a robot utility and interface device (RUID) is provided that can provide a real world interface at various locations for a user to interact with. For example, the RUID may identify a position of a user within a physical environment as well as a nearby wall for projecting a user interface. The RUID may then move about the physical environment to a location where it may project the user interface onto a region of the wall that is convenient for the user to look at. In some embodiments, the user is enabled to provide input to the interface by performing certain types of gestures. For example, the RUID may be configured to detect that a user has touched the wall at a location corresponding to a reactive element such as a button. In these and other embodiments, the RUID is additionally configured to detect other gestures made by the user, including a scrolling gesture, a zooming in or out gesture, a "back" gesture for going back to a prior page or screen, a "switch" gesture for switching between applications and/or interfaces, as well as other gestures.

According to various embodiments, a RUID captures a plurality of images of the user interface while the user is interacting with the user interface. For example, the RUID may obtain images where the user is touching or pointing to a region of the wall on which user interface is being projected on. The RUID is then able to use image analysis to determine what part of the projected user interface is being "touched" or pointed at. In response to the user's input, the RUID may then provide additional content via projection. As a result, methods and system described herein provide a technological benefit over current virtual or machine assistants by enabling the user to interface with a user interface that automatically adapts to a user's location in a real world space by projecting the user interface at a location that is convenient for the user to interact with.

According to various embodiments, the RUID is capable of providing real world assistance to a user, either automatically or in response to instruction. In one embodiment, the RUID is able to interpret instructions of a user to initiate a video game. The RUID identifies a position of the user within a physical environment as well as a suitable surface such as a wall for projecting the video game. In some embodiments, the RUID will identify a game controller from a plurality of game controllers that is to be used by the user. The RUID may do so based on one or more of an instruction of the user, a specification of a game controller contained by the video game, a preference setting of the user, a history of game controller use, a degree of randomness, and game controller use data for other users obtained via the Internet. Based on an identification of the game controller to be used, the RUID may then move to a vicinity of the user to deliver the game controller to the user. In some embodiments, the RUID is capable of delivering objects using a robot arm having a grasping mechanism. Further, in some embodiments, the plurality of game controllers or a portion thereof may be supported or docked onto the RUID. The RUID may then grasp one game controller of the plurality of game controllers and deliver it at a convenient location and height for the user. Moreover, the RUID is enabled to move to a different location for projecting the video game, if necessary or desired.

In various embodiments, the RUID is enabled to assist a user during the user's interaction with a video game. For example, if the user is playing a video game on a console system that is being displayed on a display, RUID is able to provide visual assistance by projecting onto a wall near the display a supplemental display. In the supplemental display, the RUID may provide various types of visual assistance to the user, including instructions, tips or tricks, hacks, maps, directions, walk-through guide content, or the like.

In certain other embodiments, the RUID may provide real world assistance in addition to visual assistance. For example, if a user requests real world assistance in defeating an enemy character, the RUID is able to wield and control a controller (e.g., with its robotic arm and grasper) such as an aiming device to assist in defeating the enemy character. That is, the RUID may act like a second player by helping the user in the game via a game controller. As a result, a RUID embodies a technological benefit from its ability to provide real world assistance to users that is not seen in current virtual assistants. Thus, a technological improvement to current virtual assistants is provided by the systems and methods described herein.

As used herein, "audio assistance" or "verbal assistance" is taken to mean assistance that is delivered to a person via a mode of speech or other audio. For example, certain embodiments of RUIDs are able to provide audio assistance by providing a verbal answer to a question posed by the user. In another embodiment, a RUID may provide audio assistance by presenting a surround sound component associated with media content to a user viewing said media content on an entertainment system.

As used herein, "visual assistance" is taken to mean assistance that is delivered to a person via a mode of display. For example, certain embodiments of RUIDs are capable of performing visual assistance by projecting content for display on a surface for a user to perceive.

As used herein, "real world assistance" is taken to mean assistance that is delivered to a person via a mode of physical and/or spatial action, application of force, transportation, manipulation, and/or movement. For example, certain embodiments of RUIDs are capable of providing real world assistance by delivering a game controller to a user.

It should be noted that RUIDs described here may be capable of providing each of verbal assistance, visual assistance, and real world assistance in combination or simultaneously for various situations.

FIG. 1A shows an overall flow of a method for providing an interactive user interface that is projected onto a surface such as a wall. According to the embodiment shown, the method in operation 100 identifies a position of a user within the physical environment. As will be discussed in further detail below, identification of a user may be accomplished using a plurality of sensors and cameras.

In operation 102, the method identifies a surface within the physical environment for projecting a user interface based on the position of the user. The surface may be one associated with a wall, a door, a ceiling, a piece of furniture, a post, an object held by the user, or other object. In operation 102, or in a separate operation, the method may analyze the surface for color, texture, shape, contours, geometry, size, reflectivity, refractivity, gain, position and orientation in a physical environment relative to the user and/or other optical and geometric properties. In some embodiments, a system for implementing the method shown in FIG. 1A may perform a number of tests on various surfaces by projecting a test sequence on said various surfaces and capturing the resulting projection. The system may construct a map of the various surfaces within the physical environment, the map including the location as well as the optical and geometric information of the surfaces. The system may then identify a surface that is suitable for projecting the user interface based on the map and the position of the user.

The method shown in FIG. 1A then flows to operation 104, which provides for moving within the physical environment to a location based on the identified surface and the location of the user. For example, after identifying a suitable surface for projecting the user interface, a system implementing the method shown in the FIG. 1A may not be in an optimal position to project the user interface onto the surface. The system may be too close or too far from the surface, or there may be objects occluding an optical path of the projection. Moreover, a video projector of the system may not be "square" with the surface. That is, a line or central axis of projection describing a direction of light rays emitted by the video projector may not be orthogonal to a plane describing the surface. As a result, the system may move to a location in the physical environment and orient the video projector such that the central axis of projection is more orthogonal to the surface.

In certain other embodiments, the system may compensate for a central axis of projection that is less than orthogonal by modifying images to be projected. For example, if there is a skew or obliqueness associated with a central axis of projection that results or would result in a distortion of the projected image, certain embodiments may correct for such distortion by modifying images in a manner that is opposite and proportional to the degree and directionality of distortion. In some embodiments, a combination of relocation and distortion correction may be implemented together by a system.

The method shown in FIG. 1A then flows to operation 106, which serves to project the user interface onto the surface. As a result, the user interface is made visible to the user, and the user may proceed to interact with it. There are a number of ways for a user to interact with the projected user interface, some including a touching of the surface that the user interface is being projected onto for making an input. According to other embodiments, it is contemplated that other hand gestures may generate input to the user interface, the hand gestures including a pointing of a finger, a scrolling gesture, a sign made by hand, or other hand and finger positioning and movements.

The method of FIG. 1A then flows to operation 108, which serves to capture a plurality of images of the user while interacting with the interface during the projecting the user interface on the surface. As a result, the method is able to obtain information on how the user interacts with the user interface. Moreover, in operation 110, the method determines from the plurality of images that an option is associated with a selection by the user. For example, if a user makes a gesture for selecting a particular option that is presented in the user interface, operation 110 is able to determine that the user made such a selection. In the embodiment shown, an indication may be provided to the user interface indicating that the option has been selected, according to operation 112. As a result, the user is given feedback that the selection of the option has been registered. In some embodiments, the method is able to provide additional content associated with the option in response to detecting that the user has selected the option. These embodiments will be discussed in further detail below.

Figure 1B:
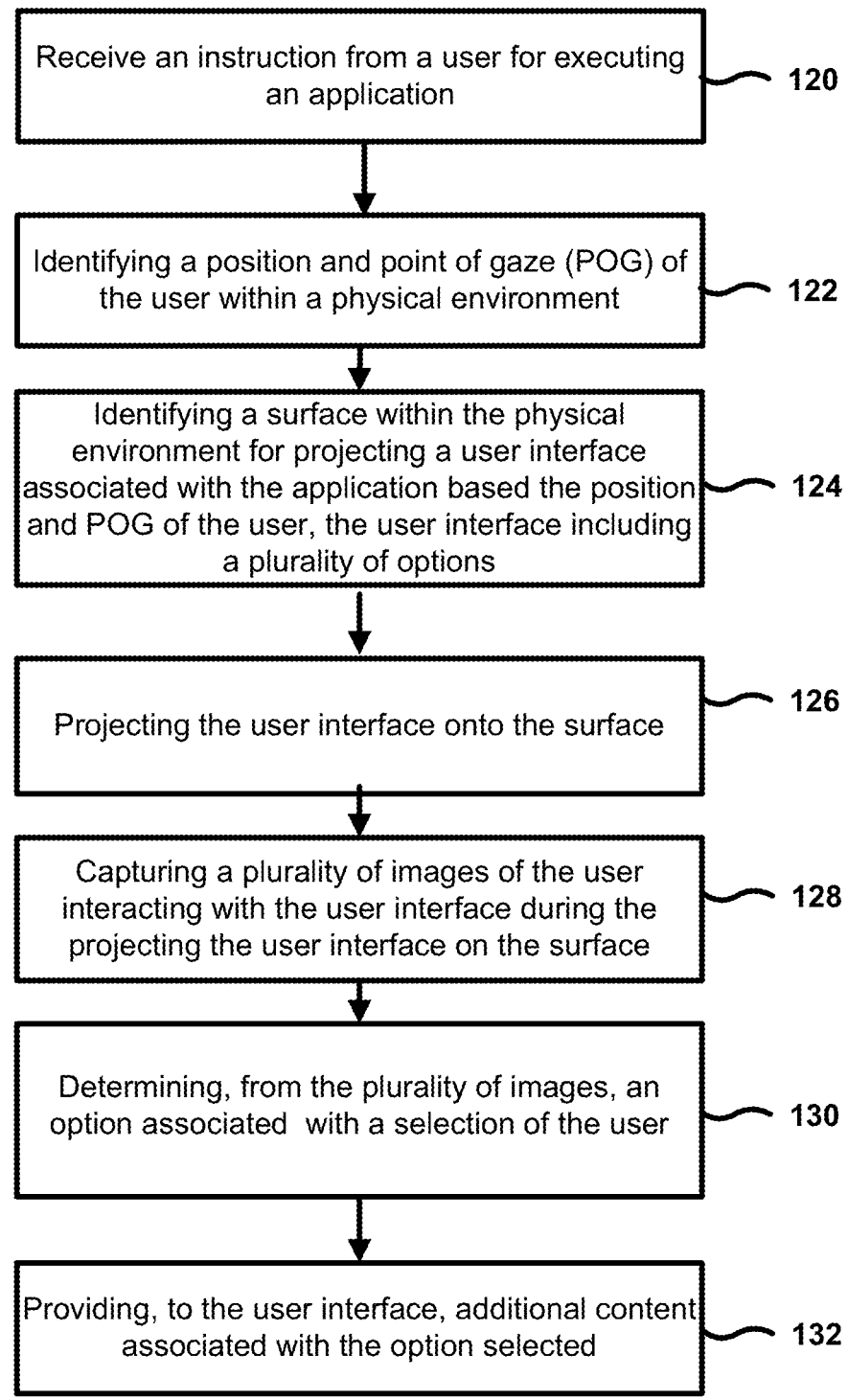

FIG. 1B shows a flow of methods for providing interactive interfaces projected onto surfaces. In 120, an instruction is received from a user for executing an application. In 122, a position and point of gaze (POG) of the user is identified within a physical environment. The method in 124 includes identifying a surface within the physical environment for projecting a user interface associated with the application based the position and POG of the user, the user interface including a plurality of options. In 126, the method includes projecting the user interface onto the surface. In 128, the method includes capturing a plurality of images of the user interacting with the user interface during the projecting the user interface on the surface. In 130, the method includes determining, from the plurality of images, an option associated with a selection of the user. In 132, the method includes providing, to the user interface, additional content associated with the option selected.

Figure 2:
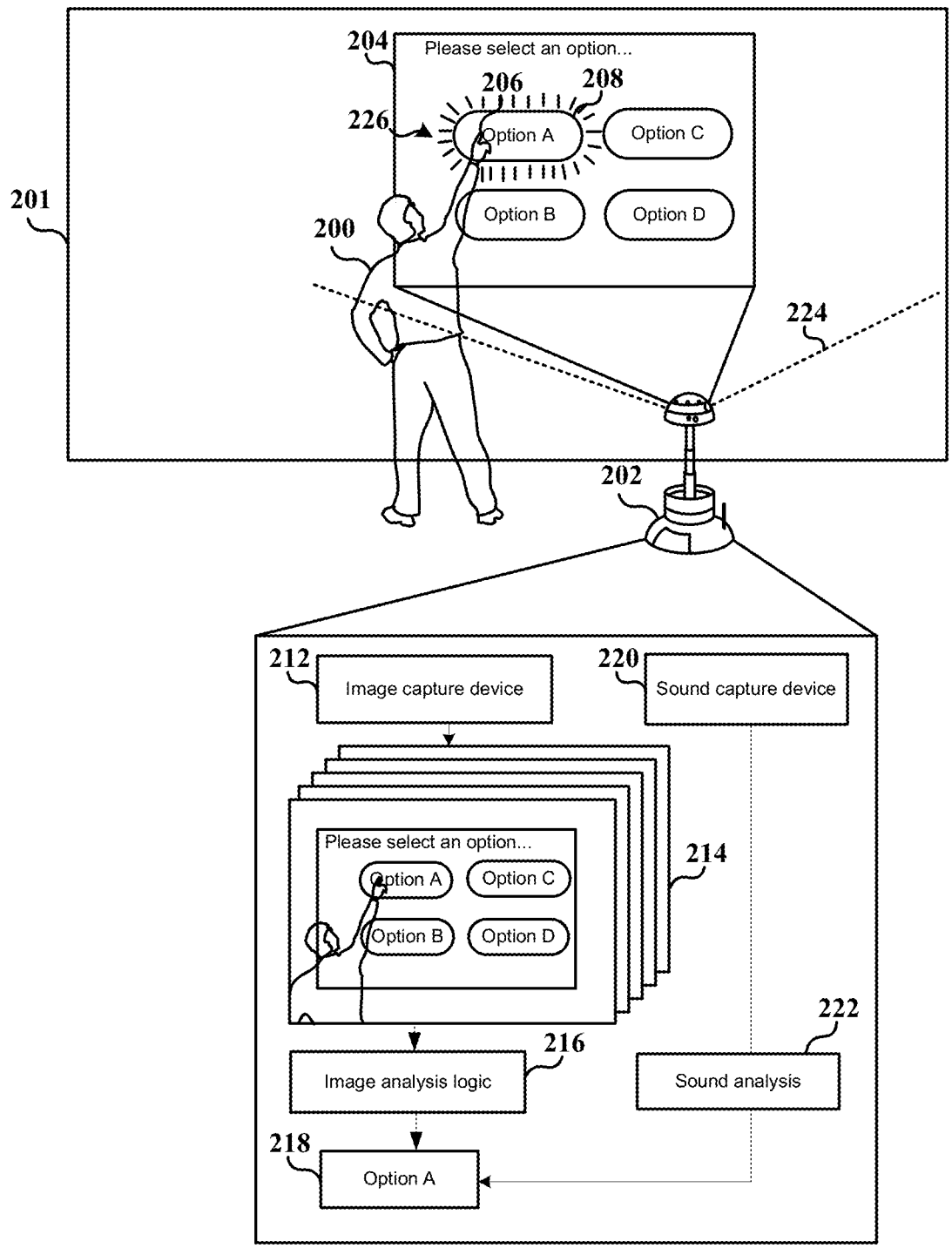
FIG. 2 shows a robot presenting an interactive interface to a user for making a selection by projecting the interactive interface onto a wall, according to one embodiment.

FIG. 2 shows a robot 202, such as a RUID, presenting an interactive interface 204 to a user 200 for making a selection by projecting the interactive interface 204 onto a wall 201. The interactive interface 204 is shown to include instruction to select between options A, B, C, and D. In response, the user 200 is shown to make a contact 206 with the wall 201 in a region associated with an Option A button 208 of the interactive interface 204. During the interaction of user 200 with the interactive interface 204, the robot 202 is shown to capture a plurality of images 214 of the interactive interface 204 with an image capture device 212 having a field of view 224 that is directed toward the interactive interface 204.

The plurality of images 214 is shown to capture the user 200 placing an index finger on the Option A button 208 of the interactive interface 204. Further, image analysis logic 216 is shown to have determined that option A 218 has been selected. As a result, robot 202 is able to determine the selection made by user 200 with respect to the interactive interface 204. Moreover, the user 200 may be given an indication 226 that his input has been received.

Robot 202 is also shown to have a sound capture device 220 for capturing sounds produced in the physical environment. In some embodiments, the sound capture device 220 is able to capture the sound of user 200 making contact 206 with wall 201 and use sound analysis 222 to determine that contact 206 has been made.

FIGS. 3A-3F illustrate various embodiments of a robot utility and interface device (RUID) providing visual assistance to a user in response to a command. As mentioned above, there are many types of assistance a user may request that are not conducive to verbal response. The embodiments shown in FIGS. 3A-3F demonstrate a few exemplary types of assistance that a RUID is capable of providing in a visual format.

Figure 3A:
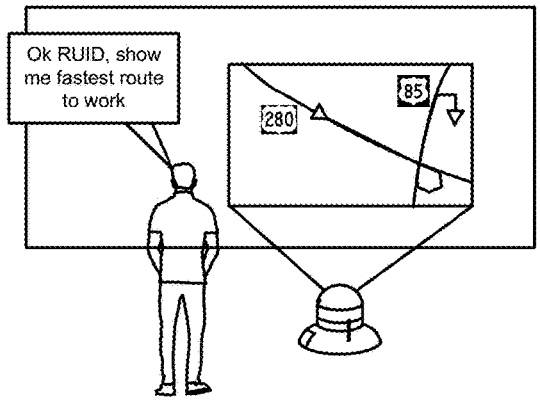
FIGS. 3A-3F show various embodiments of robot utility and interface device (RUID) enabled interactive interfacing.
Figure 3B:
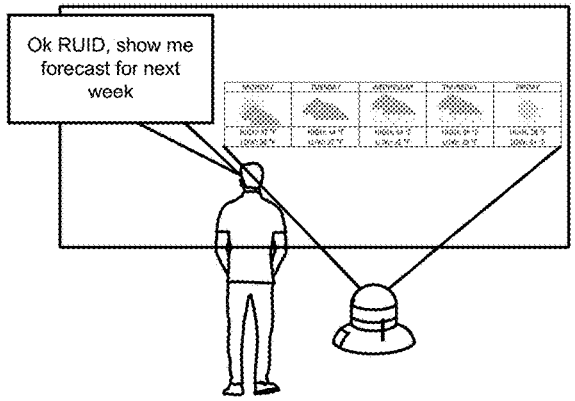
Figure 3C:
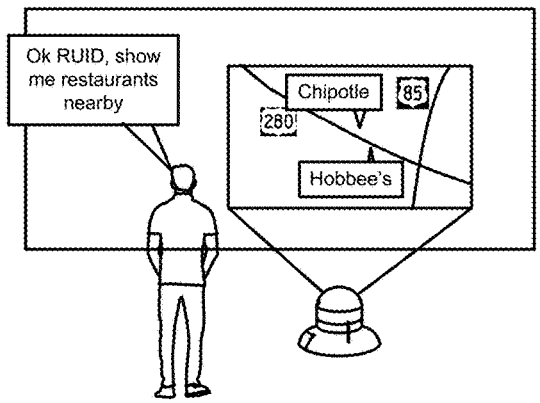
Figure 3D:
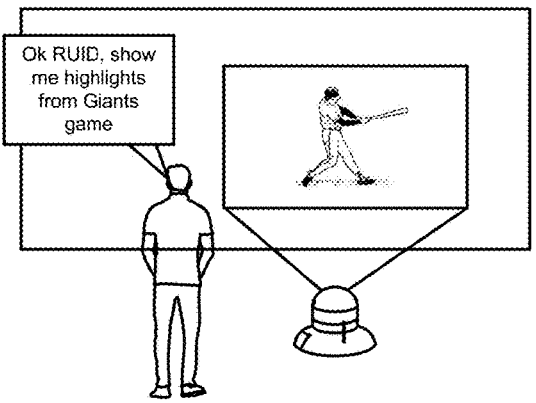
Figure 3E:
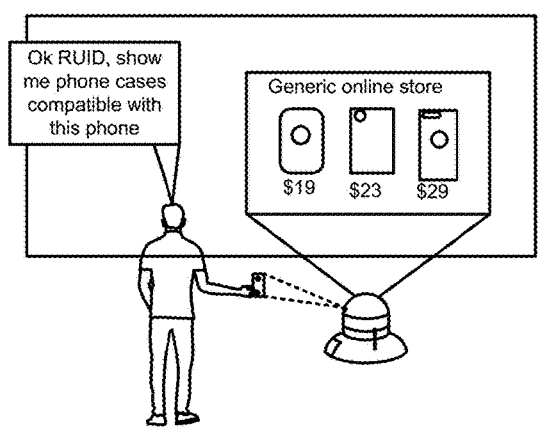
Figure 3F:
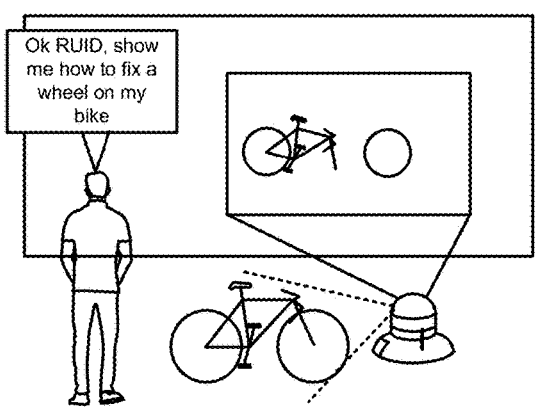

FIG. 3A shows a user requesting directions. In response, the RUID projects a map including a suggested route to take onto a wall that proximal to the user. In FIG. 3B, the RUID projects a graphical representation of the forecast in response to a user's request. FIG. 3C shows the RUID projecting a map of nearby restaurants in response to a user's request. In FIG. 3D, the RUID displays highlights of a baseball game in response to a user's request. FIG. 3E shows a user requesting that the robot display products that are compatible with a device that is already owned. The robot is shown to obtain information about the device such as a make and model by capturing images of the device. The robot then proceeds to display a plurality of items in response to the user's request. FIG. 3F shows a user requesting that the robot show how to fix a bicycle wheel. The robot, after having identified a type, make, and/or model of the wheel, may then display a video showing the user how to fix the wheel. As a result, the robot is able to provide visual assistance for many types of circumstances and in response to many types of requests. The embodiments shown in FIGS. 3A-3F are meant to be exemplary, however, and not limiting to the types of interfaces and content that a robot according to the systems and methods presented here are capable of. Additionally, it is contemplated that a robot according to the systems and methods provided herein are enabled to capture user input during interaction with the projected displays shown in FIGS. 3A-3F (please see FIGS. 1 and 2).

Figure 4A:
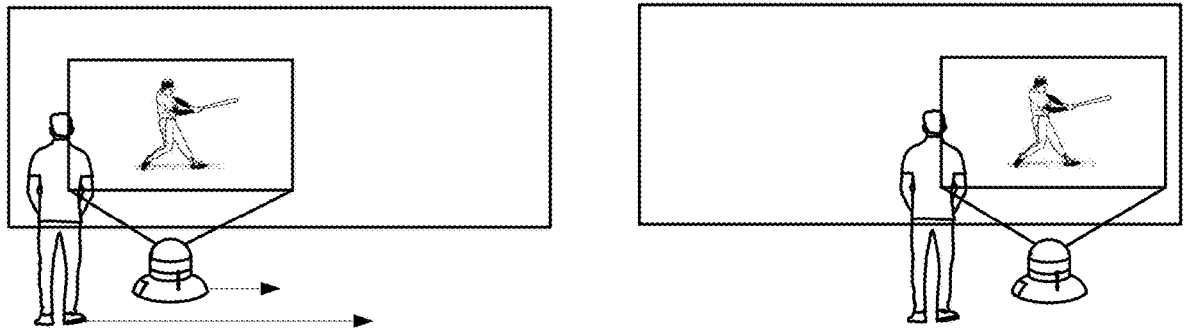
FIGS. 4A-4C show various embodiments of movement associated with a RUID.
Figure 4B:
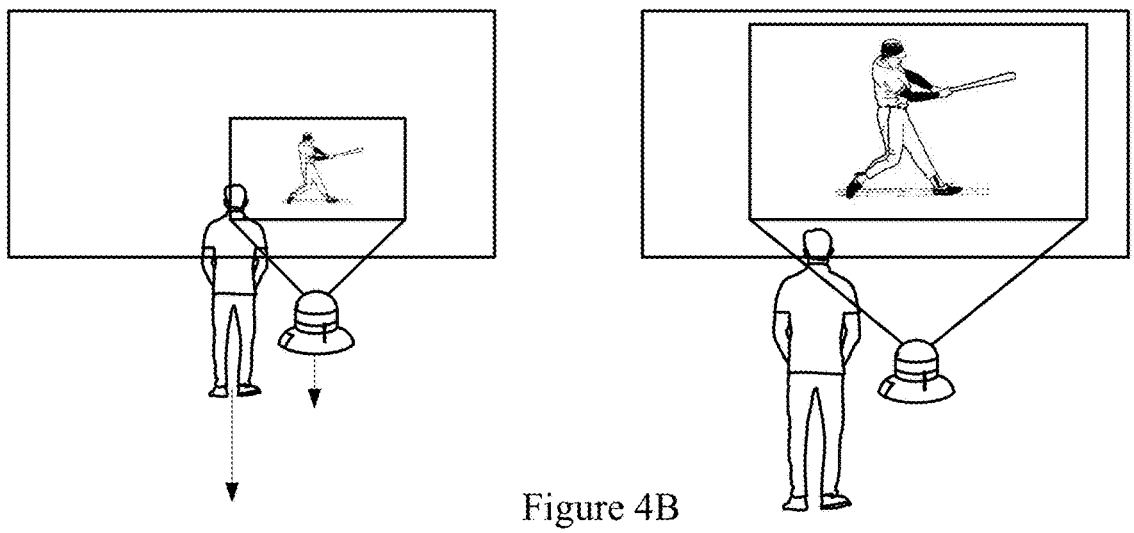
Figure 4C:
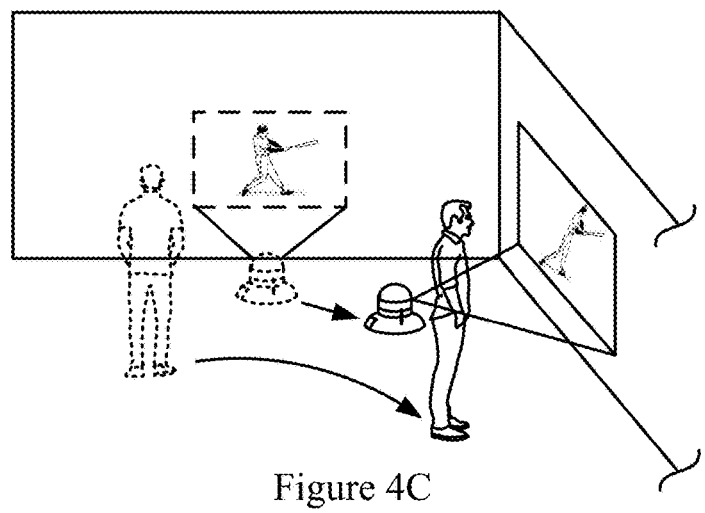

FIGS. 4A-4C demonstrate various ways in which a RUID may perform movements in response to a user's movement. For example, in FIG. 4A, a user is shown to have moved longitudinally along a wall for some distance. In response, the RUID is shown to have moved a similar distance longitudinally while continuing to project for the display of content. The RUID may detect movement of the user in a number of ways, for example via image capture, depth sensors, proximity sensors, infrared (IR) sensors, stereoscopic cameras, and the like. As a result, the user is given continuous view of the content being displayed via projection while they are moving within a physical space without having to physically transport or even provide instruction to a display device.

In FIG. 4B, a user is shown to have traveled some latitudinal distance away from the wall on which content is being displayed via projection. The robot is shown to have made the size of the display some size larger that is, for example, proportional to the distance traveled by the user. In some embodiments, the robot may be able to change a size of the display area by using a screen size adjust feature associated with a projector for projecting the display. In other embodiments, the robot may increase a distance from the wall on which the display is being projected to increase the screen size. In the embodiment of FIG. 4B, a combination of screen size adjustment via the projector and a movement away from the wall is shown to occur. As a result, the user is given a view of the display after having moved similar to that of before having moved. That is, the display is made to look just as big after the user has moved away from the wall. Moreover, the robot may adjust the display size in synchrony with the movement of the user. Thus, robots implemented according to system and embodiments described here enable a display that is further able to adjust an apparent size (e.g., how big or small the display appears) of the display in response to a user's distance away from a display. The ability to adjust an apparent size of a display in synchrony and in accordance with a user's distance away from the display provides one of many technological benefits of systems and methods presented here, and represent a technological improvement to current display technologies (e.g., flat panel displays, video projectors, handheld displays etc.).

FIG. 4C shows a user who moves from a first position that is proximal to a first wall to a second position that is proximal to a second wall. In response to the user's movement, the robot is shown to also have moved to a second position for projecting onto the second wall. During the robot's movement, a projector of the robot is also oriented such that it is directed toward the second wall. As a result, in addition to being able to move a display of content within a given surface in accordance with movement of a user, a robot in accordance with the systems and methods presented here are further able to move the display of content to different surfaces depending on where the user is moving.

Figure 5:
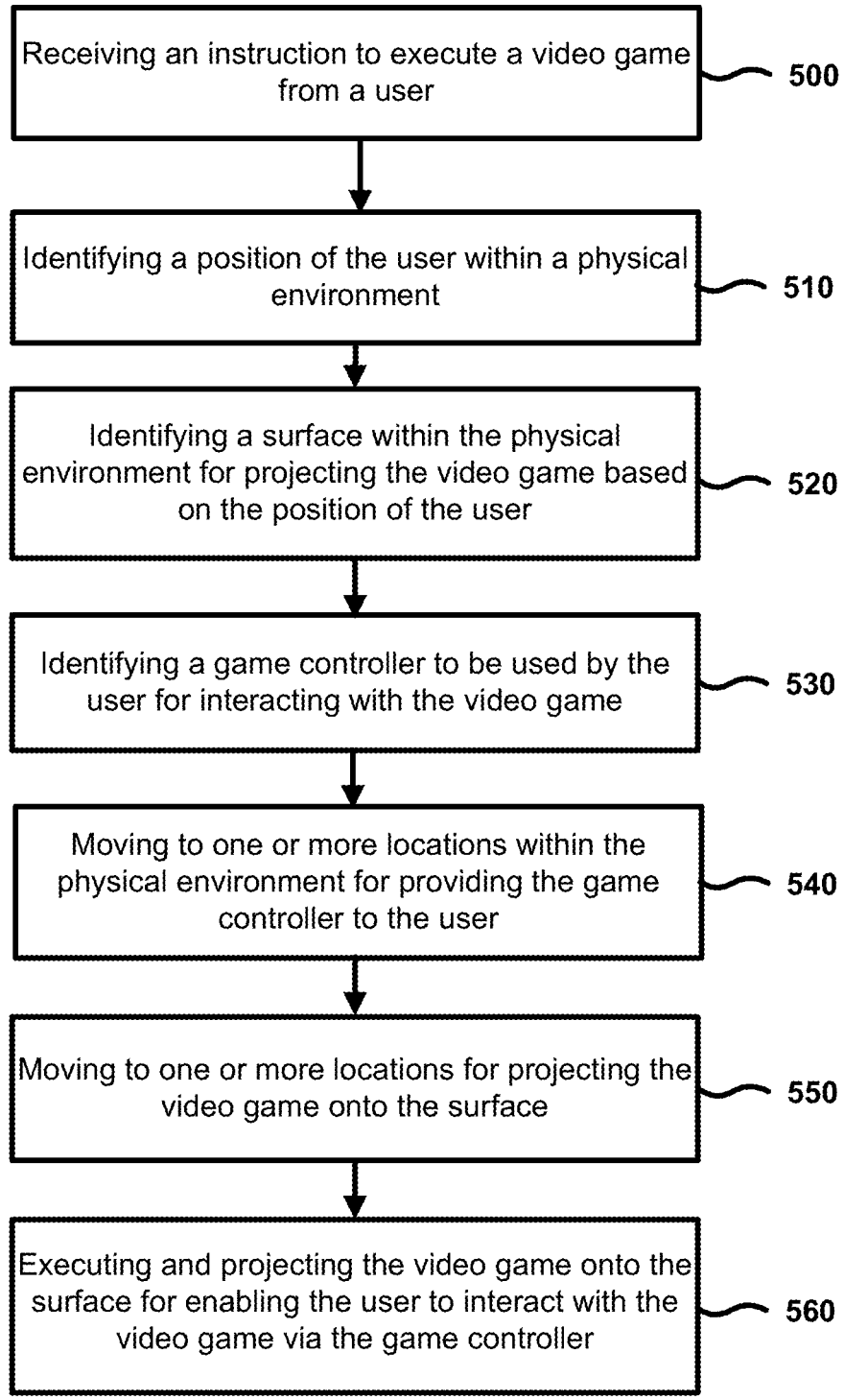
FIG. 5 shows an overall flow of a method for providing a user with a video game and a game controller for interacting with the video game, according to one embodiment.

FIG. 5 shows an overall flow of a method for executing and presenting a video game to a user as well as providing the user with a game controller for interacting with the video game, according to one embodiment. In operation 500, the method provides for receiving an instruction from a user to execute a video game. In response, the method provides for operation 510, which serves to identify a position of the user within a physical environment such as a living room or entertainment room, and for operation 520, which serves to identify a surface within the physical environment for projecting a graphical output of the video game based on the position of the user. For example, operation 510 may determine that a user is sitting on a couch at a distance of 10 feet away from a wall. Operation 520 would serve to identify the wall as a suitable surface to project the video game onto.

Further the method provides for an operation 530 that identifies a game controller to be used by the user for interacting with the video game. There are many types of game controllers used by video game players for interacting with video games. Some of them include traditional handheld controllers like the Dual Shock controller, aiming controllers, wand-like controllers, joystick controllers, sword controllers, steering wheel controllers, and many more. According to the method shown in FIG. 5, operation 530 is able to determine a game controller from a plurality of game controllers that is the user is to use for interacting with the video game. For example, operation 530 may identify which of the game controllers to used based one or more of the following: an explicit instruction received from the user, a specification associated with the video game, a preference setting of the user, a history of game controller use by the user, game controller user data for game controller usage tendencies of other users, machine learning directed at likelihood that a user will want to use a certain game controller, as well as other factors. For example, operation 530 may determine that a Dual Shock game controller is to be used based on one or more of the aforementioned factors. Moreover, although now shown, operation 530 may also serve to activate the identified game controller (e.g., power it on) and establish a wireless connection between the identified game controller and, for example, a robot implementing the method of FIG. 5 (e.g., via Bluetooth, Wi-Fi, near field communication, or other communication standard).

The method of FIG. 5 also includes operation 540 providing for moving to one or more locations within the physical environment for providing the game controller to the user. In some embodiments, a robot such as a RUID implementing the method shown in FIG. 5 may move within reaching distance of the user so that the user may pick the identified game controller, which may be already powered on and connected with the robot. In other embodiments, a robot carrying out the present method may include a robotic arm and grasper for picking up the identified game controller and "handing" it to the user. The plurality of game controllers may be in different regions of the physical space, or may be at a central location such as a docking station for charging. As a result, they may need to be retrieved. In certain other embodiments contemplated, the plurality of game controllers or a portion thereof may be stationed or docked onto the robot, or may be modular parts of the robot's structure.

Also shown in FIG. 5 are operations 550 and 560, which serve, respectively, to move to one or more locations for the projecting of the video game onto the identified surface, and to execute and project the graphical output of the video game onto the surface for enabling the user to view and interact with the video game via the game controller. For example, after handing the identified controller to the user in operation 540, the robot implementing the method shown may need to move to a different location better suited for projecting the video game for display. As a result of the method, a user may be provided with all of the components for playing a video game in a standalone device for implementing the present method without, for example, needing to perform any action typically related to setting up a gaming session.

Figure 6A:
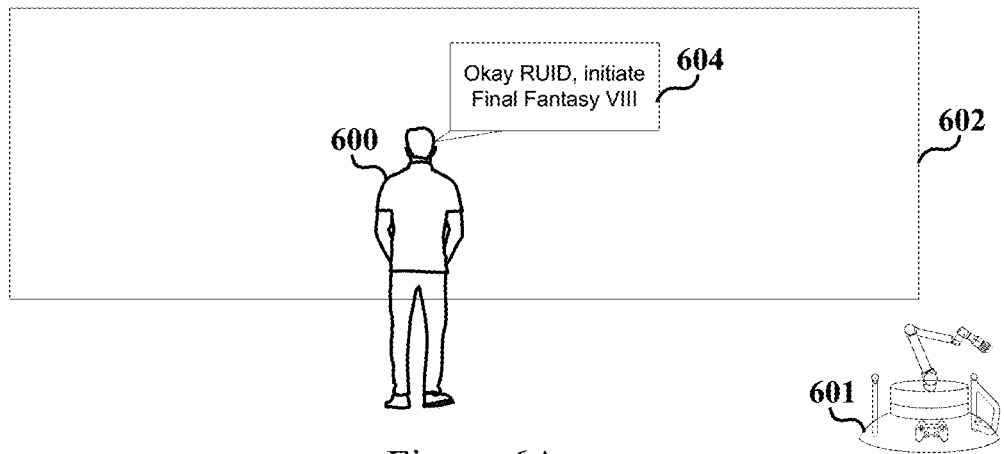
FIGS. 6A-6C show a user being provided with a video game and a game controller for interacting with the video game in response to a command, according to one embodiment.
Figure 6B:
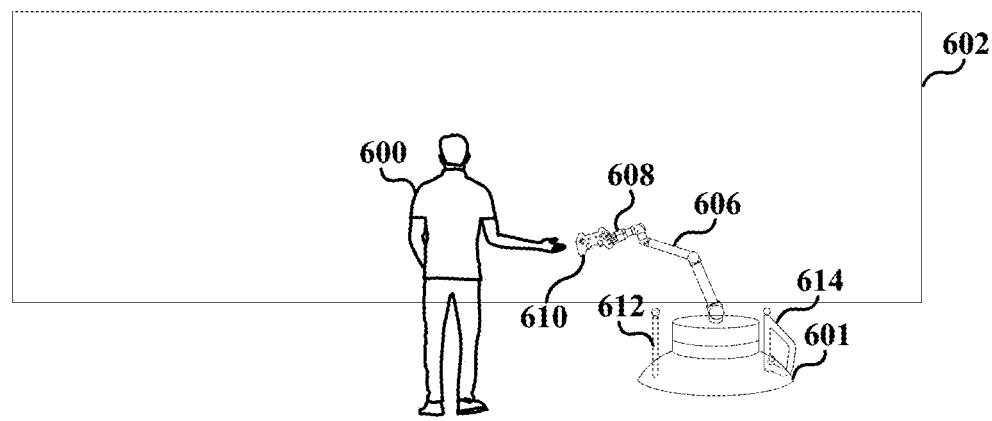
Figure 6C:
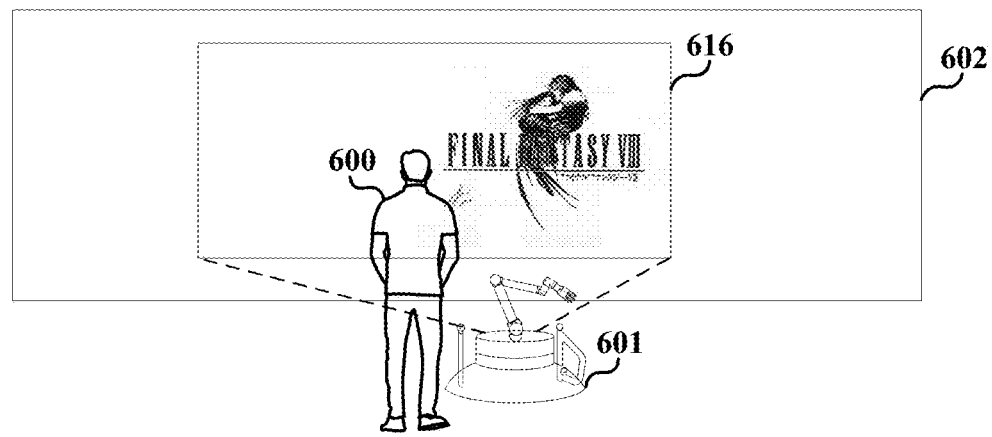

FIGS. 6A-6C illustrate a RUID 601 enabled gaming session having a user 600 provided with a game controller 610 for interacting with a game executed on the RUID 601. In FIG. 6A, the user 600 is shown to request that Final Fantasy VIII video game be initiated. RUID 601 receives the request and determines a gaming controller to be used for the video game. A number of game controllers are docked on RUID 601, including a game controller 610, a sword controller 612, and an aim controller 614. As shown in FIG. 6B, the RUID determines that game controller 610 is the game controller to be used by user 600.

Additionally, in the embodiment shown, the RUID 601 includes a robotic arm 606 and grasper 608 that is operable to grasp the game controller 610 from a position on the RUID 601 where it is docked and translocate to within a distance that is convenient for the user 600 to grab the game controller 610.

In FIG. 6C, RUID 601 is shown to be executing and projecting the graphical output of the video game 616 onto wall 602. In some circumstances, RUID 601 will move from a location for delivering the game controller 610 to a different location for projecting the video game. In other embodiments, the RUID 601 may move to a different location for projecting the video game. In either case, the user 600 is provided with components for interacting with a video game without having to perform much of the typical tasks involved with setting up a gaming session.

Figure 7A:
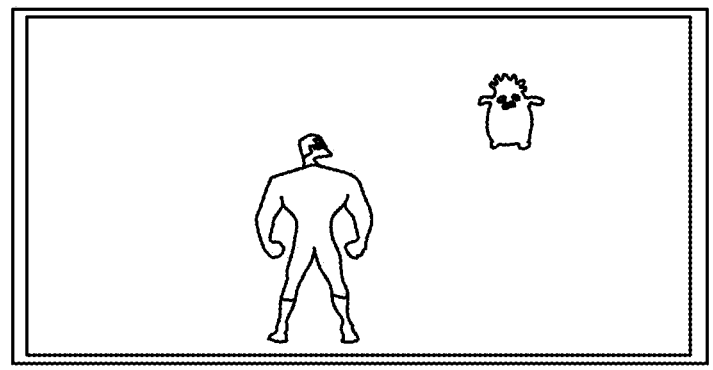
FIG. 7A shows a user being provided with a game controller in response to a command for interacting with a video game being presented on a display, according to one embodiment.
Figure 7A:
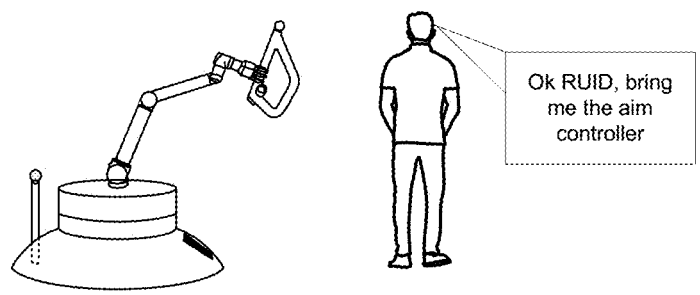

FIG. 7A-7D illustrate different ways in which a RUID may provide real world assistance a context of playing video games. In FIG. 7A a user is shown to be playing a video game displayed on a display. The video game may be executed by the RUID shown, or by a game console, personal computer, or a remote gaming server. The user is shown to request the aim controller, and the RUID is shown to hand the aim controller to the user in response. As a result, real world assistance is provided to the user, such as for wanting to switch game controllers. The user benefits by not having to pause the video game and physically retrieve the game controller, or wait for a connection between the retrieved game controller and the gaming device hosting the video game.

Figure 7B:
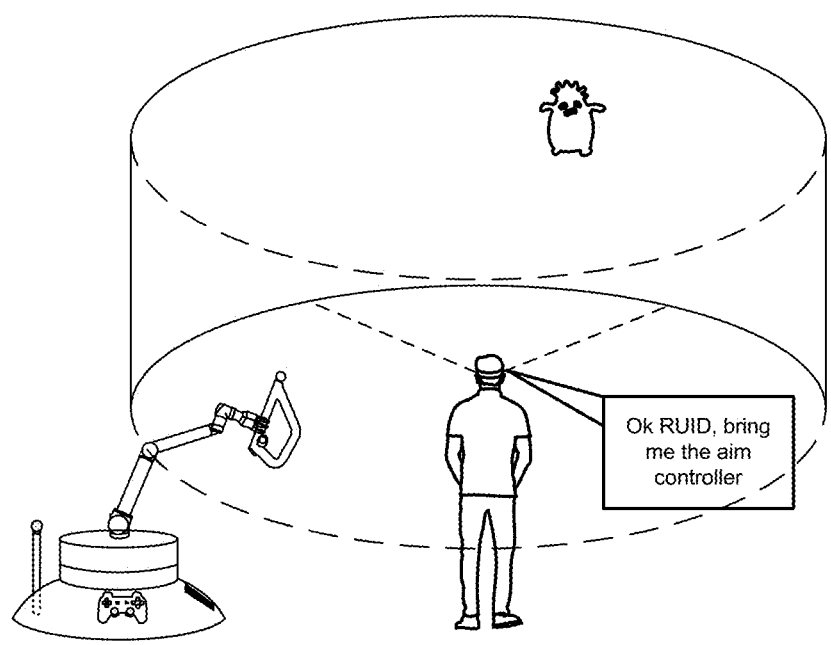
FIG. 7B shows a user being provided with a game controller in response to a command for interacting with a virtual reality environment presented via head mounted display (HMD), according to one embodiment.

FIG. 7B illustrates a user playing a virtual reality video game presented via a head mounted display (HMD). The user is provided with an aim controller in response to his request. In some embodiments, the user may be made aware of the location of the aim controller via the HMD display by having the cameras of the HMD capture images of the RUID and the aim controller. The HMD may display visual representation in real world coordinates of the aim controller to the user so that the user may reach out and grab the aim controller without having to remove the HMD.

Figure 7C:
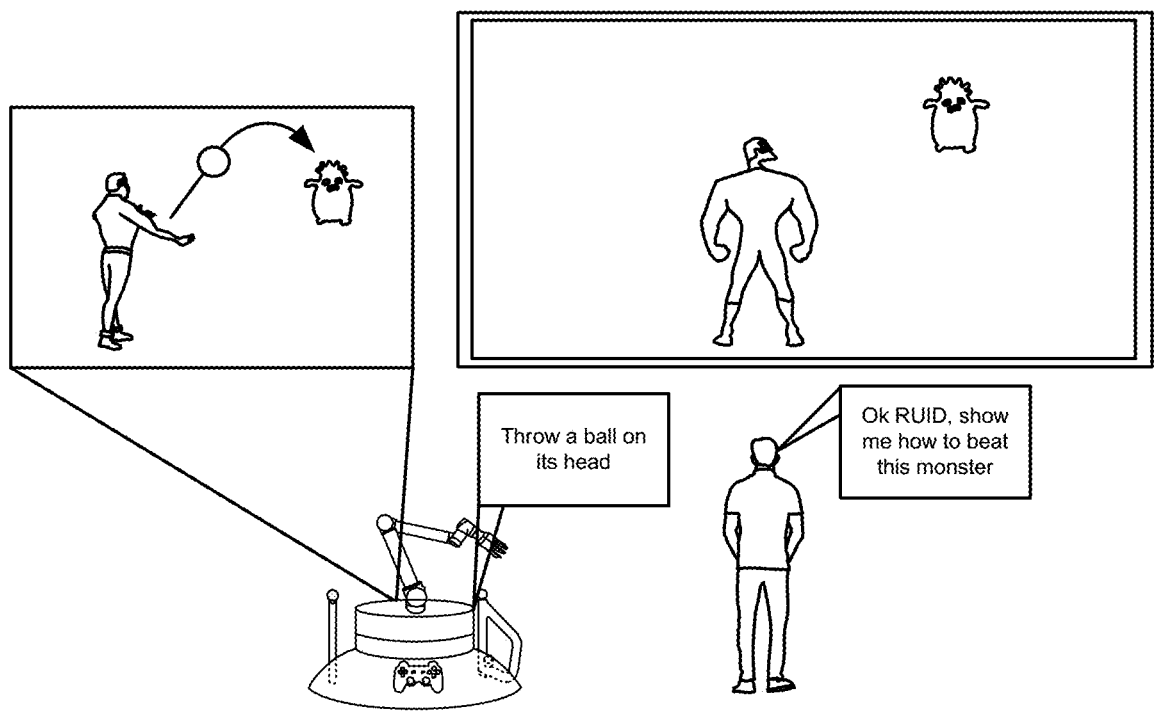
FIGS. 7C and 7D illustrate RUID-enabled assistance for a user playing a video game, according to various embodiments.

FIG. 7C shows a user who is need of help or assistance in defeating an enemy. The user is shown to request that the RUID shows the user how to defeat the monster. In response, the RUID provides visual assistance by projecting a display that includes an image or clip on how to defeat the monster. Additionally, the RUID may provide verbal assistance, including verbal instructions for how to defeat the monster.

Figure 7D:
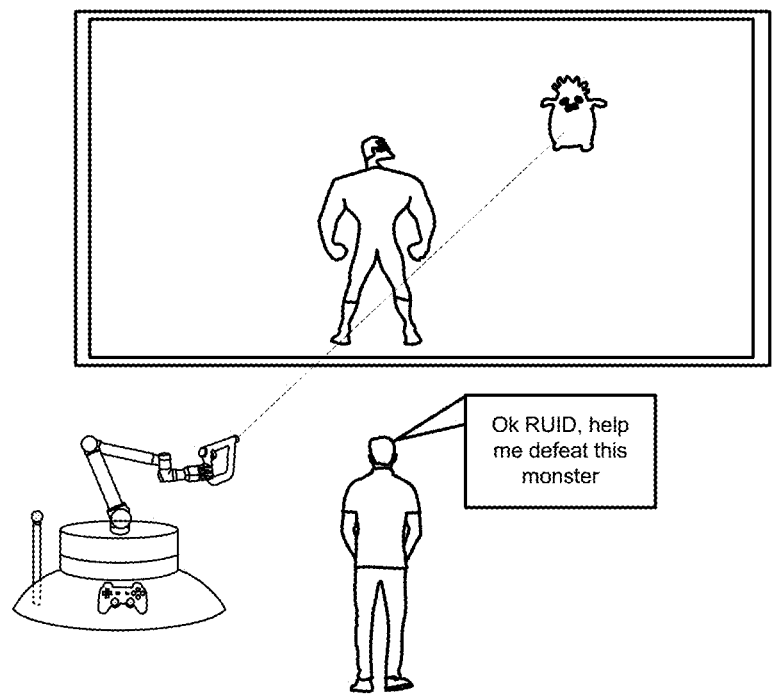

In FIG. 7D, a user is shown to request that the RUID help the user defeat the monster. Thus, instead of showing the user how to defeat the monster on a projected display (e.g., as in FIG. 7C), the RUID is shown to grasp an aim controller and use it to help the user defeat the monster. Thus, it is contemplated here that a RUID may provide assistance to the user in a way that mimics a way a second user would. Namely, it is contemplated that RUIDs are not only able to retrieve and transport game controllers but also to use them in a way a person might. As a result, methods and system described here enable robots such as RUIDs to assist users in the context of video gaming by providing assistance that requires "real world" manipulation (e.g., application of force) of real world objects (e.g., the game controller), in addition to providing verbal and visual assistance. The user is benefited in his gaming experience in ways that current methods of assisting users (e.g., virtual assistants) do not appear to be able to provide.

According to some embodiments, the RUID may also provide real world effects that correspond with virtual effects that occur within VR scene. For example, if there is a gust of wind that blows in a particular direction a game, the RUID may be enabled to produce a wind effect by blowing wind in the particular direction to the user in the real world. Thus, it is contemplated that the RUID is able to augment virtual effects provided by the HMD with real world effects.

In certain other embodiments, the RUID is configured to be sat on or ridden by an HMD user being presented with a VR scene. The RUID is enabled to interact with the HMD and/or computing device that executes the VR scene such that it moves the HMD user atop the RUID in a manner that corresponds with the HMD user's movement in the VR scene. For example, if a VR scene includes a segment that has the user moving to the right for 3 feet in the virtual space, the RUID may be synchronously move itself and sitting HMD user 3 feet to the right in the real world. Thus, the RUID is able to provide additional real world effects that enhance VR effects. As a result, it is contemplated that the RUID is able to provide a more immersive virtual experience for an HMD user.

Figure 8:
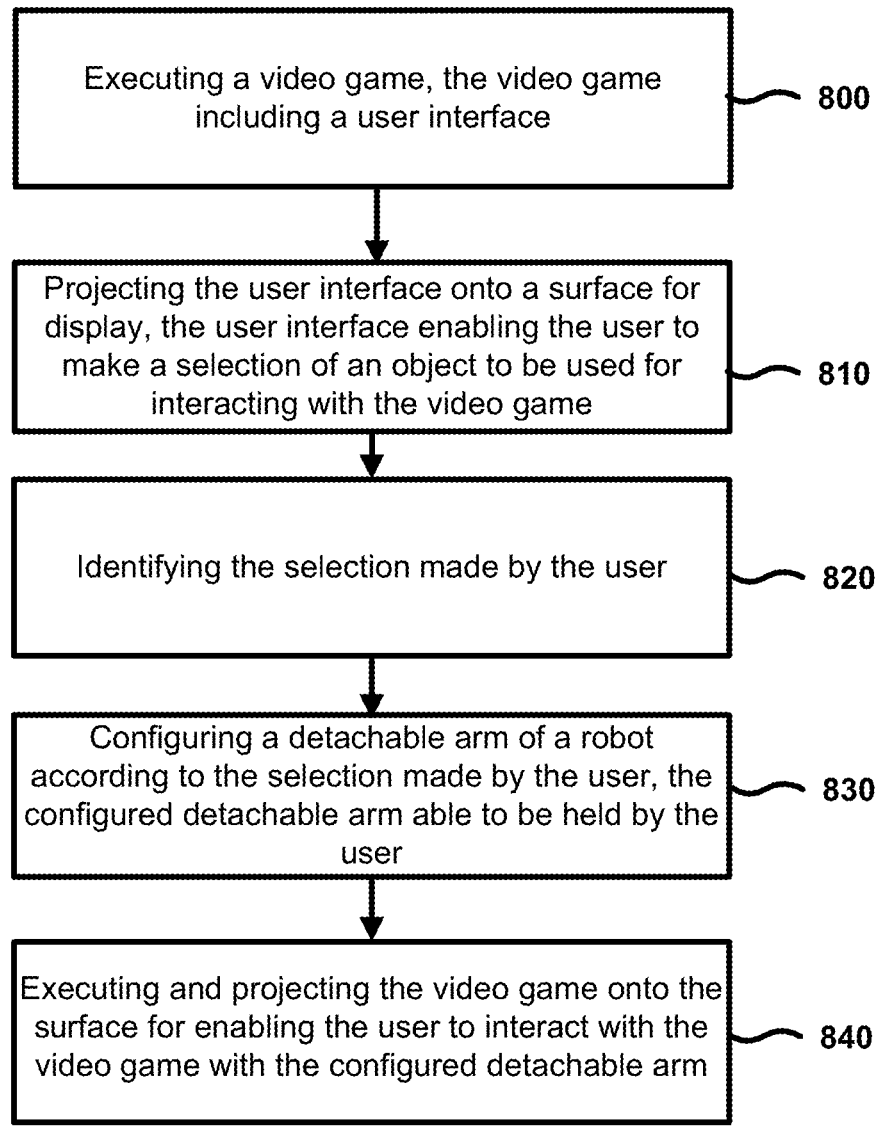
FIG. 8 shows an overall flow of a method for providing a user with one of a plurality of variably structurally configured game controllers for interacting with a video game.

FIG. 8 shows and overall flow of a method for providing a user with one of a plurality of variably configured robotic arms to be used as a game controller. FIG. 8A includes an operation 800 for executing a video game including a user interface. Operation 810 serves to project the user interface onto a surface for display to the user. The user interface enables the user to make a selection of an object to be used for interacting with the video game. Often, video games will enable users to have a tool or weapon or other piece of equipment for interacting with the video game. The user interface of operation 810 enables the user to choose a piece of equipment that the user wants to use for interacting with the video game. Operation 820 serves to identify the selection made by the user.

The method of FIG. 8 then flows to operation 830, which provides for configuring a detachable arm of a robot such as a RUID according to the selection made by the user, where the detachable arm is able to be held by the user. According to some embodiments the detachable arm of the robot may be configured into a plurality of shapes or modules to be used to interact with the video game. The robot may configure the arm into a certain shape, and in some embodiments, engage mechanisms for locking or making rigid the detachable arm in the desired shape. The user is then able to detach the detachable arm from the robot for use in the game.

According to various embodiments, the detachable arm is formed by operation 830 into a shape that corresponds to a shape of the selected piece of equipment identified in operation 820. For example, if the selection identified in operation 820 is for a sword, the operation 830 may configure the detachable arm to have a straight elongated shape. If, on the other hand, the selection is for a shield, operation 830 may configure the detachable arm to be in a different shape. As a result, the user is provided with a plurality of game controller configurations that accord in shape with the piece of equipment the user chooses to use. Further, operation 840 serves to execute and project the video game onto the surface for enabling the user to interact with the video game using the detachable arm in the configured shape.

According to certain other embodiments, a robot may configure a detachable arm for a user to use in a game that is executing on a computing device that is of the robot and not displayed by the robot. For example, in these embodiments a robot may connect to a computing device such as a game console, a personal computer, a tablet, or a remote game server for receiving information about a video game being played by a user. It may also receive information relating to a piece of equipment the user selects to use for interacting with the video game. The robot may then configure a detachable arm according to the received information for the selected piece of equipment. As a result, the robot may provide various game controller configurations for users interacting with other video game platforms.

Figure 9A:
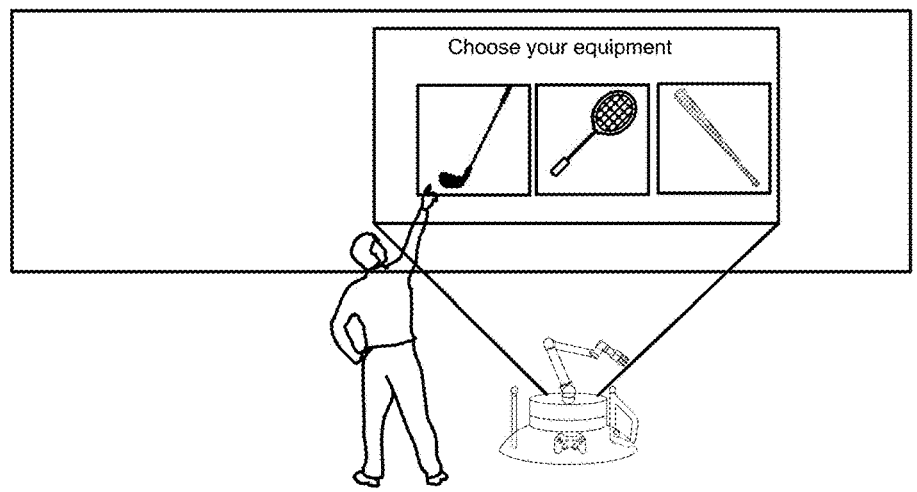
FIGS. 9A-9C illustrate a RUID-enabled gaming session wherein a detachable arm of the RUID is configured according to a selection made by a user and used for interacting with a video game.
Figure 9B:
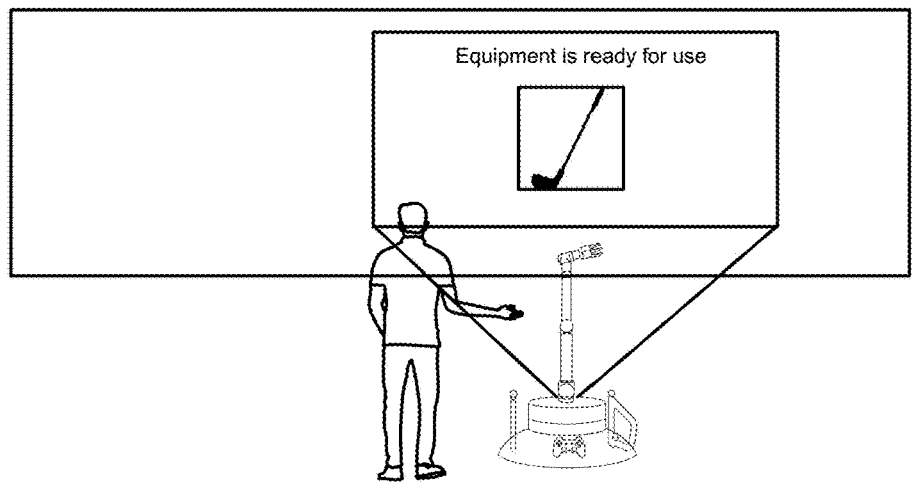
Figure 9C:
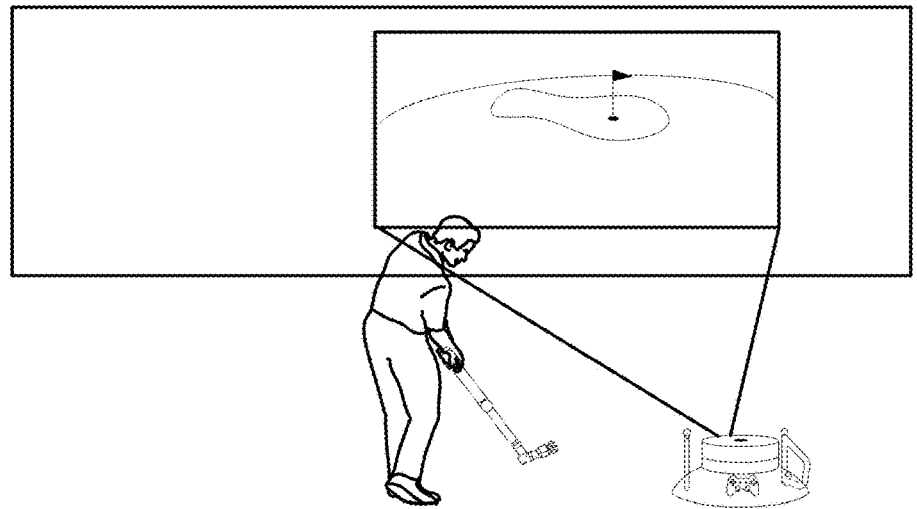

FIGS. 9A-9C illustrate a RUID-enabled gaming session wherein a detachable arm of the RUID is configured according to a selection made by a user and used for interacting with a video game. In FIG. 9A, a RUID is shown to display a user interface via a projector for a user to select between different pieces of equipment. In response, the user is shown to select a golf club by indicating his selection with his finger.

In FIG. 9B, a detachable arm of the RUID is shown to have been configured into a different shape. In particular, the detachable arm is shown to have been elongated into having a substantially straight shaft. Moreover, a longitudinal axis of a grasper of the detachable arm is shown to be configured to be at an obtuse angle relative to the longitudinal axis of the elongated shaft portion of the detachable arm. As a result, the detachable arm is configured into a shape that accords with a shape of the selected equipment. Namely, the detachable arm may be used as a golf club game controller by the user. After the detachable arm is configured according to the user's selection, the user interface indicates that the equipment is ready for the user to use.

In FIG. 9C, the detachable arm of the RUID having been configured to function as a golf club is shown to be used by the user to play in a golf game. In various embodiments, the user input made through the detachable arm (e.g., swinging the 'golf club controller') may be obtained via a plurality of sensors located within the physical environment and/or on the RUID for detecting location and movement of the detachable arm. For example, the detachable arm may include a plurality of light emitting diodes (LEDs) on its surface that are tracked by cameras in the physical environment. Moreover, the detachable arm may include inertial sensors to sense movement and acceleration of the detachable arm through space. As a result, the RUID executing the video game is enabled to transduce and convert physical movement of the detachable arm, as well as other game controllers, into virtual movement. For example, the RUID is able to determine a virtual response to the user's swinging of the 'golf club controller' from analyzing the golf club game controller's position in space at different times. Depending on the mechanics of the user's swing of the golf club controller and the mechanics of the video game, the RUID will present a corresponding virtual response displayed on the projected display.

It should be noted the detachable arm may have been configured differently had the user selected a different piece of equipment to use for the video game. For example, had the user selected a tennis racket, the configuration of the detachable arm may have been made to resemble an overall feel of a tennis racket. Thus, the detachable arm may have been disjointed such that only a portion of the detachable is used as the game controller (see FIG. 11).

Figure 10A:
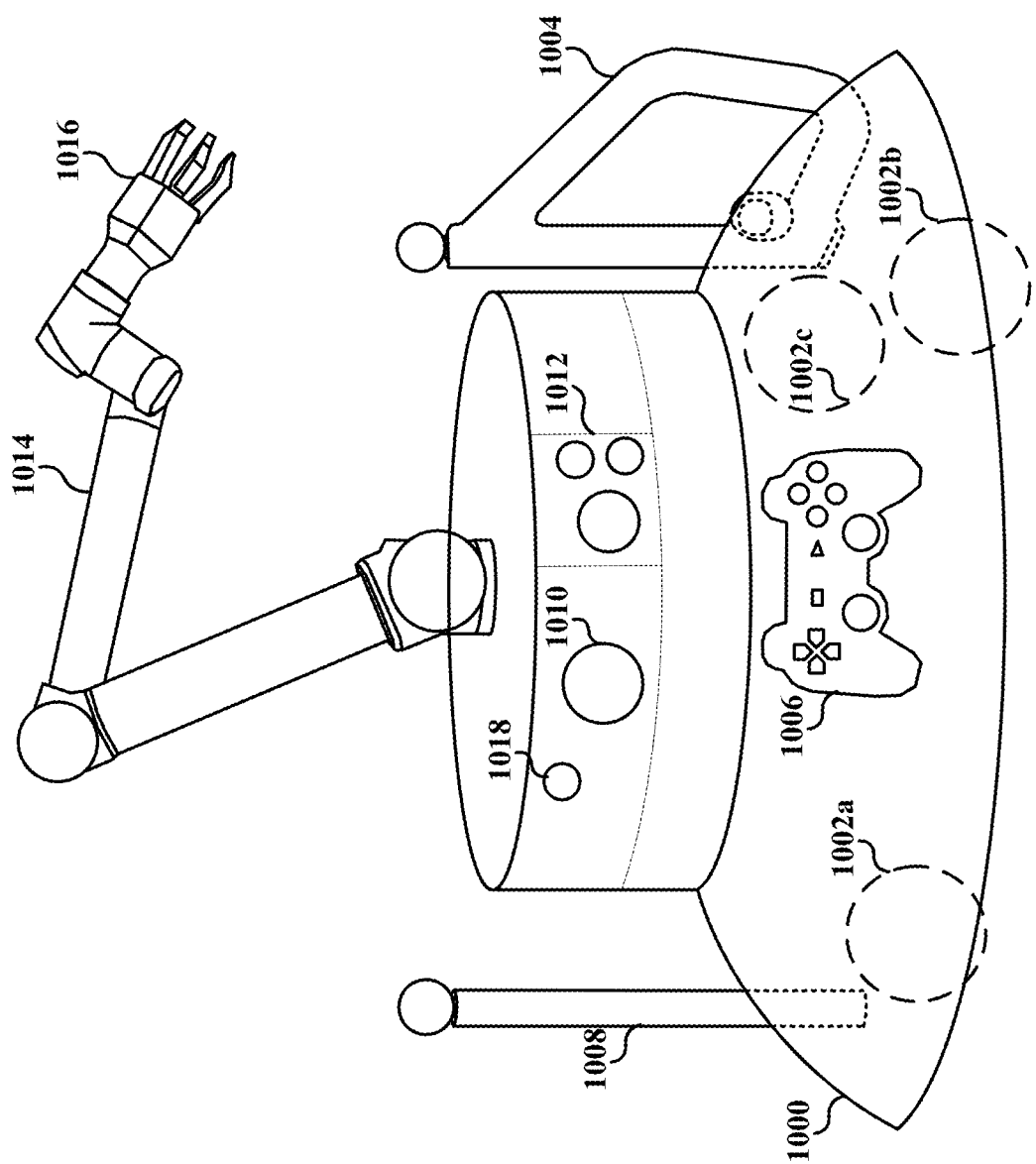
FIG. 10A-10D show various embodiments of RUIDs and RUID enabled activity.

FIG. 10A illustrates an embodiment of a robot utility and interface device (RUID) 1000 for enabling methods presented here. The RUID 1000 is shown to include wheels 1002a-1002c for moving within a physical environment. The RUID 1000 is also shown to dock an aim controller 1004, a Dual Shock controller 1006, and a sword controller 1008. In some embodiments, the RUID 1000 is able to charge one or more of controllers 1004-1008 with an on-board battery (not shown).

RUID 1000 is also shown to include a video projector 1010 for projecting user interfaces and media content such as video games onto surfaces for display to a user. A sensor module 1012 enables the RUID 1012 to map and navigate the physical environment, identify a user's position, and identify surfaces for displaying content. The sensor module 1012 may include a number of sensors, including proximity sensors, depth sensors, cameras, stereoscopic cameras, infrared sensors, magnetic sensors, radar, among others. The RUID 100 is also shown to have a robotic arm 1014 and grasper 1016 for providing real world assistance such as retrieving and delivering game controllers to a user, helping a user exchange game controllers, 'putting away' game controllers. Moreover, as discussed above, the robotic arm 1014 may be configurable into different shapes and detachable for use as a game controller for interacting with a video game.

Although not shown, in some embodiments the RUID may be used as a footrest by a user. In certain embodiments, a footrest attachment or cushion may be compatible with the RUID and the arm and grasper of the cushion. As a result, the RUID may support a foot rest cushion at a height that is adjustable and comfortable to a user who is sitting in a chair or on a couch.

According to the embodiment shown, RUID 100 also includes a microphone 1018 for capturing voice commands of a user and other sounds of the physical environment.

Figure 10B:
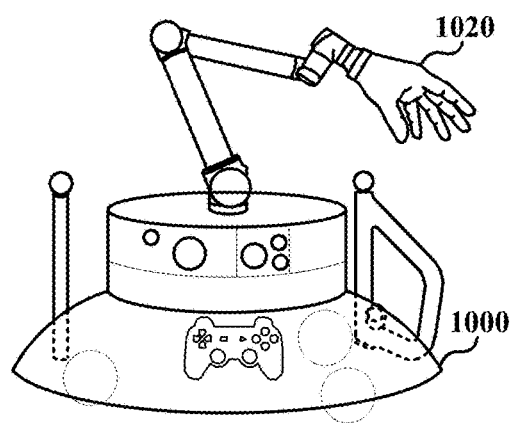
Figure 10C:
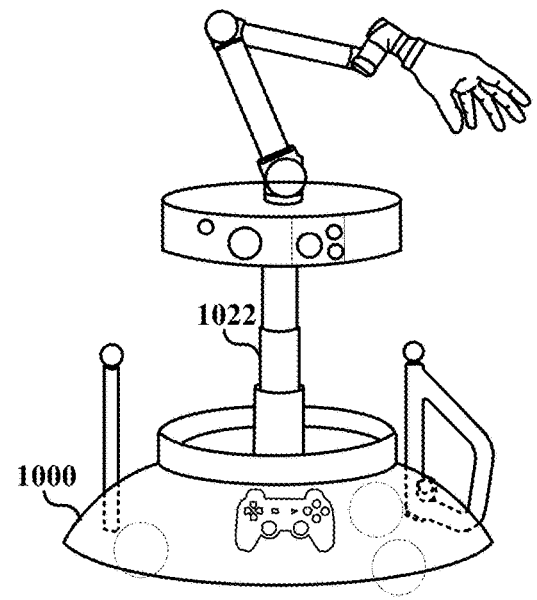

FIG. 10B illustrates an additional embodiment of a RUID 1000 having a grasper hand 1020 that is also contemplated here. The grasper hand 1020 is shown to take on a shape that is similar to a human hand, and as a result, may interact with the user to mimic behavior of a human hand. In FIG. 10C, an additional embodiment of a RUID 1000 is shown to have a telescoping device 1022 for elevating certain portions of the RUID 1000. For example, the telescoping device 1022 may be able to elevate a projector, a sensor module, and/or a camera, as well as other components. Moreover, the telescoping device 1022 may also be able to elevate a robotic arm having a grasper.

Figure 10D:
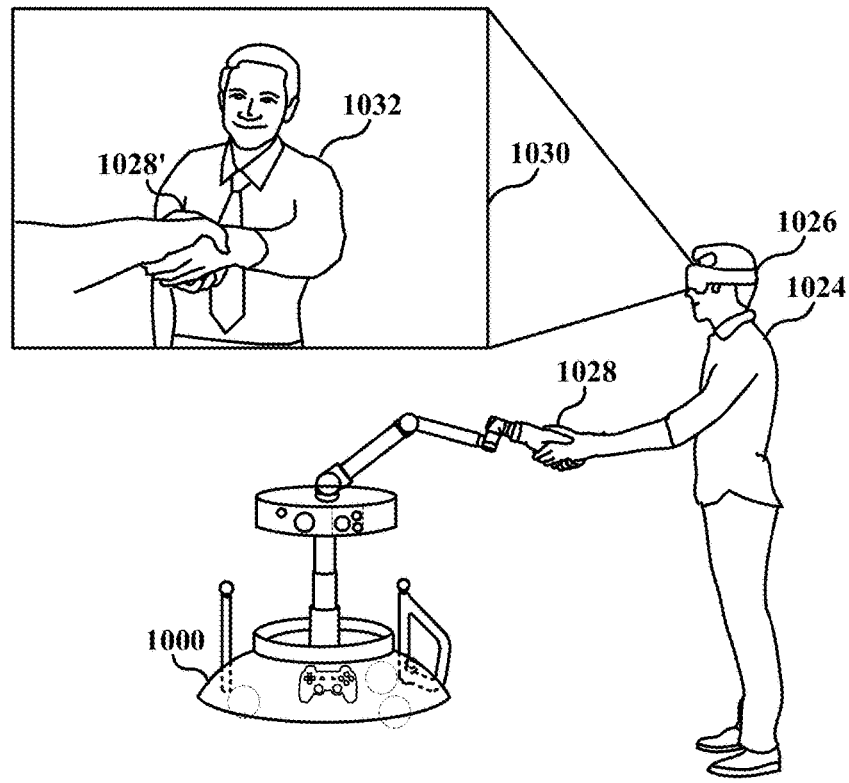

In FIG. 10D, a user 1024 is shown to be wearing a head mounted display (HMD) 1026 for presentation of a virtual reality scene 1030. In the virtual reality (VR) scene 1030, user 1024 is shown to attempt to shake hands with a character 1032. In some embodiments, the VR scene 1030 may be executing on the RUID 1000, which provides images associated with the VR scene 1030 to the HMD 1026 via wireless connection. Concurrently, while the user reaches his hand out to perform a virtual handshake 1028', the RUID 1000 provides a real world hand shake 1028 with the user 1024. As a result, the user 1024 is given a physical sensation of a real world handshake 1028 that corresponds to his virtual handshake 1028'.

According to certain embodiments, a robot is able to track the position of the hand of the user 1024, as well as the location of the robot's grasper hand 1020. Additionally, the robot has information related to where the hand of the VR character 1032 should be. As a result, the robot is able to place its grasper hand 1020 at a location relative to the user 1024 that corresponds to where the user 1024 perceives the hand of the character 1032 to be in a virtual space. As a result, when the user 1024 reaches out his hand, the grasper hand 1020 is in position to meet it for a real world handshake 1028.

Although a left-handed grasper hand is shown in FIGS. 10B-D, it is to be understood that right-handed grasper hand may also be used in different embodiments. Moreover, some embodiments may have RUIDs with two or more robotic arms, each of the arms having a grasper hand.

Figure 11:
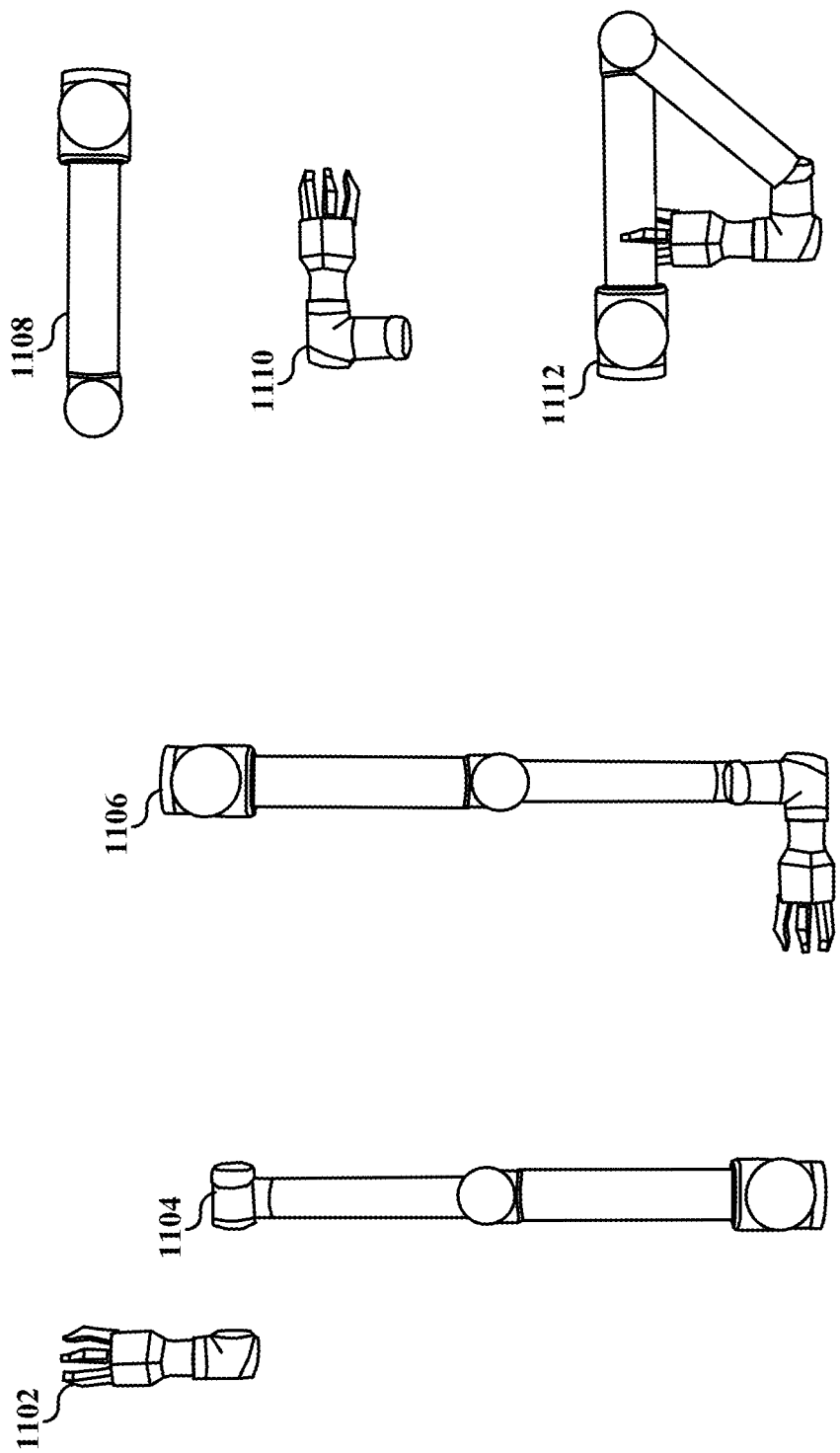
FIG. 11 shows various configurations of an arm of a RUID that may be used as game controllers.

FIG. 11 illustrate various configurations of an arm of a RUID that may be used as game controllers. For example, configuration 1102 is provided by detaching the grasper of the arm. A game controller of configuration 1102 may be used as a ping-pong paddle, a wand, a pointing or aiming device, or other one-handed device. A game controller of configuration 1104 may be used as a baseball bat, a cricket bat, a sword, a light saber, a pole, a staff, or other one or two-handed device. A game controller of configuration 1106, as shown in FIG. 9C, may be used as a golf club. Additionally, however, the configuration 1106 may also be used as shooting device, a cannon, a mortar, a rocket propelled grenade (RPG) launcher, a scythe, or other device. A game controller of configuration 1108 may be used as a tennis racket, a racquet ball racket, a baton, a dagger, a shield, a wand, or other device. A game controller of configuration 1110 may be used as an aiming device, or other device. A game controller of configuration 1112 is shown to be of a trapezoidal shape, having the grasper grasp a portion of the shaft of the arm. A game controller of such a configuration may be used as a shield, an aiming device, a steering wheel, a crossbow or other bow, a shooting device, an aiming device, or other type of equipment. Of course, there are many additional configurations of the robot arm that are possible, but not illustrated in FIG. 11. As a result, the configurations shown in FIG. 11 are meant to be exemplary and limiting, and the many additional configurations do not depart from the scope and spirit of the embodiments described here.

FIG. 12A-12E illustrate conceptual models for orienting a video projector 1201 of a robot 1200 to be square with a surface to be projected on. For example, FIG. 12A shows a robot 1200 having a video projector 1201 with a projection axis 1202 forming an angle Θ of 90° with wall 1204. A projection axis is an imaginary line that describes an average directionality of light rays associated with a projection, or a center of such projection, or a line that generally describes a directionality of the projection. As a result, the video projector 1201 is square with the wall 1204 and projected images are not distorted. In contrast, robot 1200 in FIG. 12B is shown to be oriented such that the projection axis 1202' form an angle Θ' with the wall 1204 that is not 90° (e.g., perpendicular). As a result, images that are projected, without correction, may be skewed or distorted, because the projection axis 1202' is not perpendicular with the wall 1204.

FIG. 12C illustrates one way robot 1200 is able to orient video projector 1201 to be square with wall 1204. Robot 1200 is shown to send a pulse 1206 to measure a distance from wall 1204. The robot 1200 moves in various directions until it moves in a direction that a subsequent pulse 1206' indicates that the robot maintains a similar distance away from the wall 1204 as it travels along that direction. The pulses may include an acoustic pulse, IR light, laser light, or other electromagnetic signal for detecting distance. In FIG. 12D, the robot 1200 rotates while emitting a continuous test pulse for finding an orientation in which the pulse is reflected back the most. In FIG. 12E, the robot 1200 accesses a map 1210 of the physical environment. The robot 1200 is able to determine its position 1200' in map 1210 via GPS and its orientation via compass. As a result, the robot 1200 can orient its video projector to be square with wall 1204 (e.g., by having a projection axis that is perpendicular). As a result, an additional technological benefit of a self-aligning projector extends from the methods and system described here and embodied by a RUID.

Figure 13:
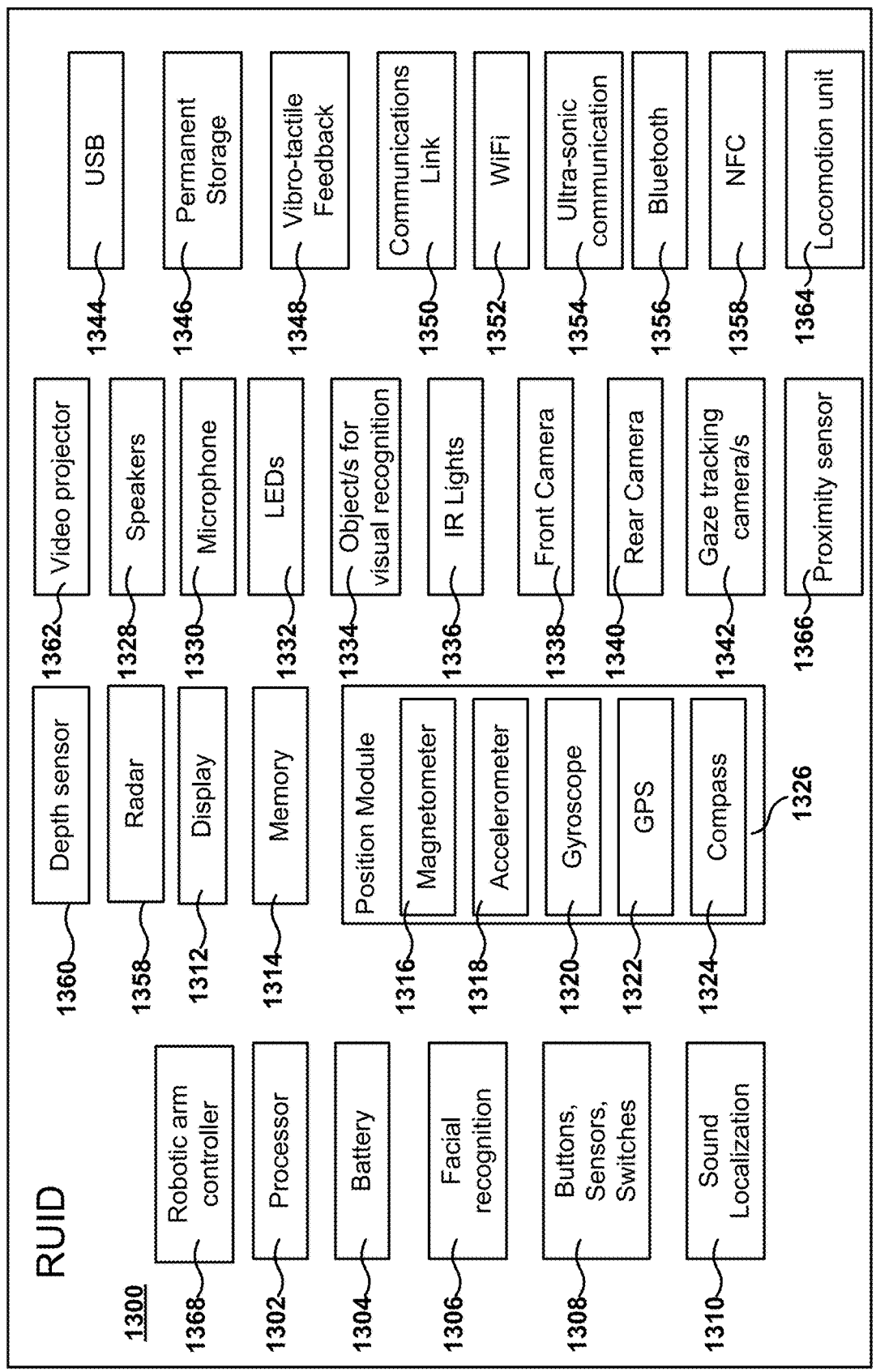
FIG. 13 shows an additional embodiment of a RUID and some associated components.

FIG. 13 illustrates an additional embodiment of a RUID 1300 that may be used with the presented method and/or system. Robot 1300 includes hardware such as processor 1302, battery 1304, facial recognition 1306, buttons, sensors, switches 1308, sound localization 1310, display 1312, and memory 1314. Robot 1300 is also shown to include a position module 1326 that comprises a magnetometer 1316, an accelerometer 1318, a gyroscope 1320, a GPS 1322, and a compass 1324. Further included in robot 1300 are speakers 1328, microphone 1330, LEDs 1332, object/s for visual recognition 1334, IR lights 1336, front camera 1338, rear camera 1340, gaze tracking camera/s 1342, USB 1344, permanent storage 1346, vibro-tactile feedback 1348, communications link 1350, WiFi 1352, ultra-sonic communication 1354, Bluetooth 1356, near field communication (NFC) 1358, depth sensor 1360, video projector 1362, locomotion unit 1364, and proximity sensor 1366, and robotic arm controller 1368.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for providing an interactive interface by a robot, the method comprising:
   identifying a position of a user in a physical environment and a point of gaze (POG) of the user;
   identifying a surface within the physical environment for projecting the interactive interface based on the position of the user, wherein the identified surface is updated based on an update in the position of the user and the POG of the user;
   the robot moving to a location within the physical environment based on the position of the user, the POG of the user, and the surface for projecting the interactive interface;
   projecting onto the surface the interactive interface, the interactive interface including a plurality of input options, responsive to detecting a change in the POG of the user, moving the robot such that the interactive interface is continuously projected in the direction of the POG in the physical environment;
   capturing a plurality of images of the interactive interface while the interactive interface is being interacted with by the user; and
   determining, from the plurality of images, an input option associated with a selection made by the user, the input option being communicated to a server for processing the selection.

2. The method of claim 1, further comprising:
   providing, to the interactive interface, a feedback that the input option associated with the selection made by the user has been made.

3. The method of claim 1, wherein projecting the user interface is performed by a projection device having a lens system for focusing light to render images associated with the interactive interface onto the surface.

4. The method of claim 1, wherein the projecting the user interface includes projecting a graphical user interface (GUI) associated with the interactive interface and graphical selection buttons associated with the plurality of input options.

5. The method of claim 1, wherein said identifying the surface within the physical environment includes analyzing attributes of the surface, the attributes including one or more of reflectivity, contrast, color, texture, area, gain, or surface contours.

6. The method of claim 1, further comprising:
   correcting for skew in an appearance of the interactive interface during said projecting the interactive interface, the correcting including distorting one or more images associated with the user interface before being projected onto the surface.

7. The method of claim 1, further comprising:
correcting for a skew in appearance of the interactive interface during said projecting the interactive interface, the correcting including one or both of moving to a second location or changing an orientation for projecting the interactive interface, or adjusting the location of the robot, or a combination thereof.

8. The method of claim 1, further comprising:
detecting a diminution of contrast associated with the interactive interface based on an analysis of one or more colors associated with the surface; and
correcting for the diminution of contrast by adjusting one or more colors associated with the interactive interface based on the analysis of the one or more colors associated with the surface.

9. The method of claim 1, wherein said determining, from the plurality of images, the input option associated with the selection made by the user includes detecting a touch made by the user on the surface in a region associated with the input option of the interactive interface.

10. The method of claim 9, wherein said determining the input option associated with the selection made by the user further includes capturing a sound associated with the touch made by the user on the surface.

11. The method of claim 1, wherein said determining the input option associated with the selection made by the user includes detecting a hand gesture, a hand position, a hand motion, a finger position, a finger motion, a hand placement, a finger placement, or a hand sign, or a combination of two or more thereof.

12. The method of claim 1, further comprising:
receiving, from the server in response to said processing the selection, additional content for the projecting onto the surface.

13. A method for providing a gaming session by a robot, comprising:
receiving, from a user, an instruction for executing a video game;
identifying a position of the user within the physical environment and a point of gaze (POG) of the user;
identifying attributes of a surface within the physical environment for projecting the video game;
determining a game controller from a plurality of game controllers to be used by the user for interacting with the video game;
establishing a wireless connection with the game controller;
the robot moving to a first location proximal to the user for providing the game controller to the user based on the position of the user;
the robot moving to a second location for projecting a graphical output of the video game based on the position of the user, the POG of the user, and the attributes of the surface; and
executing the video game and projecting the graphical output of the video game onto the surface, wherein the game controller enables the user to interact with the video game, wherein the surface is updated based on an update in the position of the user and the POG, responsive to detecting a change in the POG of the user, moving the robot such that the graphical output of the video game is continuously projected in the direction of the POG in the physical environment.

14. The method of claim 13, wherein said determining the game controller from a plurality of game controllers is based on one or more of a request made by the user, a preference setting of the user, a prediction, a degree of randomness, or a specification provided by the video game.

15. The method of claim 13, wherein the game controller is a detachable part that is mounted on the robot.

16. The method of claim 13, wherein said providing the game controller to the user is performed by a robotic arm of the robot.

17. The method of claim 13, wherein the game controller to be used by the user for interacting with the video game is a robotic arm of the robot.

* * * * *